United States Patent
Walsky

(10) Patent No.: US 9,881,329 B1
(45) Date of Patent: Jan. 30, 2018

(54) SYSTEM AND METHOD FOR FACILITATING COMMERCIAL TRANSACTIONS OVER A DATA NETWORK

(75) Inventor: Joshua P. Walsky, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

(21) Appl. No.: 11/016,245

(22) Filed: Dec. 17, 2004

Related U.S. Application Data

(63) Continuation of application No. 09/770,522, filed on Jan. 26, 2001, now abandoned, which is a continuation-in-part of application No. 09/760,061, filed on Jan. 12, 2001, now Pat. No. 7,206,756.

(60) Provisional application No. 60/176,117, filed on Jan. 14, 2000.

(51) Int. Cl.
  *G06Q 30/00* (2012.01)
  *G06Q 30/06* (2012.01)

(52) U.S. Cl.
  CPC ......... *G06Q 30/0621* (2013.01); *G06Q 30/06* (2013.01); *G06Q 30/0641* (2013.01); *G06Q 30/0643* (2013.01)

(58) Field of Classification Search
  CPC .......................................... G06Q 30/00–30/08
  USPC ............................................... 705/26.1–27.2
  See application file for complete search history.

(56) References Cited

U.S. PATENT DOCUMENTS

| | | |
|---|---|---|
| 4,799,156 A | 1/1989 | Shavit et al. ............. 364/401 |
| 4,870,571 A | 9/1989 | Frink |
| 4,992,940 A | 2/1991 | Dworkin ...................... 364/401 |
| 5,193,056 A | 3/1993 | Boes |
| 5,369,732 A | 11/1994 | Lynch et al. |
| 5,398,308 A | 3/1995 | Kato et al. |
| 5,493,490 A | 2/1996 | Johnson |
| 5,500,802 A | 3/1996 | Morris et al. |

(Continued)

FOREIGN PATENT DOCUMENTS

| | | |
|---|---|---|
| CA | 2153530 | 1/1997 |
| EP | 1001355 | 5/2000 |

(Continued)

OTHER PUBLICATIONS

Fixmer, Andrew H.; "Let's Make a Deal, Now on the Web," New York Times, Late Edition, East Coast, New York, Dec. 24, 1999, p. F1, extracted from the Internet from http://proquest.umi.com on Jan. 17, 2004.

(Continued)

*Primary Examiner* — Michael Misiaszek

(57) ABSTRACT

A method, a computer system and a computer program product to facilitate comparison-price shopping over a data network, such as the Internet, is provided that includes a price availability feature guaranteeing a price of a product associated with product-related information stored on a server. To that end, information that concerns a product is rendered on a display in a browser window. The information rendered typically includes offered price data. A server is provided that includes a plurality of addresses in an address space, and a subportion of the plurality of addresses is associated with an identification code. Acceptance to the offered price data is achieved by storing the information in the subportion, defining agreed price data. The agreed price data is maintained in the absence of a predetermined system event.

21 Claims, 36 Drawing Sheets

(56) References Cited

U.S. PATENT DOCUMENTS

| | | | |
|---|---|---|---|
| 5,515,524 A | 5/1996 | Lynch et al. | |
| 5,708,798 A | 1/1998 | Lynch et al. | |
| 5,710,887 A | 1/1998 | Chelliah et al. | |
| 5,712,989 A | 1/1998 | Johnson et al. | |
| 5,715,314 A | 2/1998 | Payne | |
| 5,732,400 A | 3/1998 | Mandler et al. | 705/26 |
| 5,734,150 A | 3/1998 | Brown et al. | 235/381 |
| 5,742,931 A | 4/1998 | Spiegelhoff et al. | 705/8 |
| 5,745,681 A | 4/1998 | Levine et al. | |
| 5,749,785 A | 5/1998 | Rossides | 463/25 |
| 5,754,850 A | 5/1998 | Janssen | |
| 5,758,328 A | 5/1998 | Giovannoli | 705/26 |
| 5,825,651 A | 10/1998 | Gupta et al. | |
| 5,842,178 A | 11/1998 | Giovannoli | 705/26 |
| 5,842,218 A | 11/1998 | Robinson | |
| 5,844,554 A * | 12/1998 | Geller et al. | 715/744 |
| 5,852,809 A | 12/1998 | Abel et al. | 705/26 |
| 5,870,717 A | 2/1999 | Wiecha | |
| 5,878,400 A | 3/1999 | Carter, III | 705/20 |
| 5,893,076 A | 4/1999 | Hafner et al. | 705/28 |
| 5,895,454 A | 4/1999 | Harrington | 705/26 |
| 5,895,468 A | 4/1999 | Whitmer, Jr. | 707/10 |
| 5,897,621 A | 4/1999 | Boesch et al. | |
| 5,905,975 A | 5/1999 | Ausubel | |
| 5,907,320 A | 5/1999 | Beesley et al. | |
| 5,909,492 A | 6/1999 | Payne | |
| 5,918,214 A | 6/1999 | Perkowski | |
| 5,924,082 A | 7/1999 | Silverman et al. | 705/37 |
| 5,926,817 A | 7/1999 | Christeson et al. | 707/10 |
| 5,930,779 A | 7/1999 | Knoblock et al. | |
| 5,937,390 A | 8/1999 | Hyodo | |
| 5,940,807 A | 8/1999 | Purcell | |
| 5,950,177 A | 9/1999 | Lupien et al. | 705/37 |
| 5,960,411 A | 9/1999 | Hartman et al. | |
| 5,963,915 A | 10/1999 | Kirsch | 709/203 |
| 5,963,939 A | 10/1999 | McCann et al. | |
| 5,970,470 A | 10/1999 | Walker et al. | 705/14 |
| 5,970,472 A | 10/1999 | Allsop et al. | 705/26 |
| 5,970,475 A | 10/1999 | Barnes et al. | 705/27 |
| 5,974,406 A | 10/1999 | Bisdikian et al. | 707/1 |
| 5,978,776 A | 11/1999 | Seretti et al. | 705/26 |
| 5,978,785 A | 11/1999 | Johnson et al. | 706/54 |
| 5,983,194 A | 11/1999 | Hogge et al. | |
| 5,987,423 A | 11/1999 | Arnold et al. | 705/14 |
| 5,991,739 A | 11/1999 | Cupps et al. | 705/26 |
| 6,002,854 A | 12/1999 | Lynch et al. | |
| 6,009,406 A | 12/1999 | Nick | |
| 6,012,051 A | 1/2000 | Sammon et al. | 706/52 |
| 6,014,644 A | 1/2000 | Erickson | 705/37 |
| 6,016,504 A | 1/2000 | Arnold et al. | 709/200 |
| 6,029,141 A | 2/2000 | Bezos et al. | 705/27 |
| 6,041,310 A | 3/2000 | Green et al. | |
| 6,047,264 A | 4/2000 | Fisher et al. | 705/26 |
| 6,055,513 A | 4/2000 | Katz et al. | |
| 6,061,057 A | 5/2000 | Knowlton et al. | 345/744 |
| 6,115,690 A | 9/2000 | Wong | |
| 6,119,101 A | 9/2000 | Peckover | 705/26 |
| 6,125,352 A | 9/2000 | Franklin et al. | |
| 6,131,087 A | 10/2000 | Luke et al. | 705/26 |
| 6,134,548 A | 10/2000 | Gottsman et al. | 707/5 |
| 6,141,006 A | 10/2000 | Knowlton et al. | 705/26 |
| 6,141,653 A | 10/2000 | Conklin et al. | 705/80 |
| 6,151,588 A | 11/2000 | Tozzoli et al. | 705/37 |
| 6,167,378 A | 12/2000 | Webber, Jr. | 705/8 |
| 6,167,383 A | 12/2000 | Henson | 705/26 |
| 6,236,972 B1 | 5/2001 | Shkedy | 705/1 |
| 6,249,772 B1 | 6/2001 | Walker et al. | 705/26 |
| 6,260,024 B1 | 7/2001 | Shkedy | 705/37 |
| 6,263,317 B1 | 7/2001 | Sharp et al. | |
| 6,282,517 B1 * | 8/2001 | Wolfe et al. | 705/36 R |
| 6,295,513 B1 | 9/2001 | Thackston | 705/26 |
| 6,311,162 B1 | 10/2001 | Reichwein et al. | |
| 6,317,722 B1 | 11/2001 | Jacobi et al. | 705/14 |
| 6,332,040 B1 | 12/2001 | Jones | |
| 6,332,135 B1 | 12/2001 | Conklin et al. | 705/80 |
| 6,338,050 B1 | 1/2002 | Conklin et al. | 705/80 |
| 6,339,763 B1 | 1/2002 | Divine et al. | |
| 6,370,653 B1 | 4/2002 | Ichinohe et al. | 709/223 |
| 6,385,602 B1 | 5/2002 | Tso et al. | |
| 6,397,212 B1 | 5/2002 | Biffar | |
| 6,405,174 B1 | 6/2002 | Walker et al. | 705/26 |
| 6,405,176 B1 | 6/2002 | Toohey | 705/26 |
| 6,405,308 B1 | 6/2002 | Gupta et al. | |
| 6,418,415 B1 | 7/2002 | Walker et al. | |
| 6,449,599 B1 | 9/2002 | Payne | |
| 6,535,294 B1 * | 3/2003 | Arledge et al. | 358/1.15 |
| 6,553,350 B2 | 4/2003 | Carter | 705/20 |
| 6,574,608 B1 | 6/2003 | Dahod et al. | 705/26 |
| 6,587,835 B1 | 7/2003 | Treyz et al. | |
| 6,598,026 B1 | 7/2003 | Ojha et al. | 705/26 |
| 6,604,093 B1 * | 8/2003 | Etzion et al. | 706/47 |
| 6,606,744 B1 | 8/2003 | Mikurak | |
| 6,609,108 B1 | 8/2003 | Pulliam et al. | |
| 6,631,365 B1 | 10/2003 | Neal et al. | 707/2 |
| 6,651,217 B1 | 11/2003 | Kennedy et al. | 715/507 |
| 6,654,726 B1 | 11/2003 | Hanzek | |
| 6,671,716 B1 | 12/2003 | Diedrichsen et al. | 709/203 |
| 6,675,294 B1 | 1/2004 | Gupta et al. | |
| 6,725,257 B1 * | 4/2004 | Cansler et al. | 709/219 |
| 6,728,685 B1 | 4/2004 | Ahluwalia | |
| 6,865,524 B1 | 3/2005 | Shah et al. | |
| 6,895,388 B1 | 5/2005 | Smith | |
| 6,901,430 B1 | 5/2005 | Smith | |
| 6,920,431 B2 | 7/2005 | Showghi et al. | 705/26 |
| 6,928,411 B1 | 8/2005 | Fox et al. | |
| 6,957,186 B1 | 10/2005 | Guheen et al. | |
| 6,963,847 B1 | 11/2005 | Kennedy et al. | 705/8 |
| 6,980,963 B1 | 12/2005 | Hanzek | |
| 7,003,548 B1 * | 2/2006 | Barck et al. | 709/203 |
| 7,069,237 B1 | 6/2006 | Tate | 705/26 |
| 7,165,041 B1 * | 1/2007 | Guheen et al. | 705/26 |
| 7,197,479 B1 | 3/2007 | Franciscus de Heer et al. | |
| 7,246,087 B1 | 7/2007 | Ruppelt et al. | |
| 7,272,639 B1 | 9/2007 | Levergood et al. | |
| 7,353,192 B1 * | 4/2008 | Ellis et al. | 705/27 |
| 7,415,435 B1 | 8/2008 | Weiss et al. | |
| 7,512,548 B1 * | 3/2009 | Bezos et al. | 705/26 |
| 8,126,777 B2 | 2/2012 | Postelnik et al. | |
| 2001/0011222 A1 | 8/2001 | McLauchlin et al. | 705/1 |
| 2001/0011250 A1 * | 8/2001 | Paltenghe et al. | 705/41 |
| 2001/0047284 A1 | 11/2001 | Blalock | |
| 2002/0032626 A1 | 3/2002 | DeWolf et al. | |
| 2004/0177002 A1 * | 9/2004 | Abelow | 705/14 |
| 2005/0102199 A1 | 5/2005 | Lee | |

FOREIGN PATENT DOCUMENTS

| | | | |
|---|---|---|---|
| WO | 90/11572 A1 | 10/1990 | |
| WO | WO 93/24892 | 12/1993 | G06F 15/22 |
| WO | 96/12242 A1 | 4/1996 | |
| WO | 97/04410 A1 | 2/1997 | |
| WO | 97/13329 A2 | 4/1997 | |
| WO | WO 98/19259 | 5/1998 | G06F 17/60 |
| WO | 00/29976 A1 | 5/2000 | |
| WO | 00/65505 A2 | 11/2000 | |
| WO | 01/16665 A2 | 3/2001 | |

OTHER PUBLICATIONS

"pcOrder's Solutions: Software, Content and Community," http://corporate.pcorder.com/solutions/, Feb. 17, 2000, 1 page.
"pcOrder: Technology Overview," http://corporate.pcorder.com/technology/, Feb. 17, 2000, 1 page.
"pcOrder: Products," http://corporate.pcorder.com/products/, Feb. 17, 2000, 1 page.
"pcOrder: Products/eStation," http://corporate.pcorder.com/products/estation/estation.pdf/, Feb. 17, 2000, 14 pages.
"pcOrder: Products/eStation/Features," http://corporate.pcorder.com/products/estation/features.asp, Feb. 17, 2000, 1 page.
"pcOrder: Products/eStation/Benefits," http://corporate.pcorder.com/products/estation/benefits.asp, Feb. 17, 2000, 2 pages.
Jastrow, David, "PcOrder connects buyers and sellers," Computer Reseller News, Nov. 15, 1999, Iss. 869, p. 48.

(56) References Cited

OTHER PUBLICATIONS

Information on Alibaba-Inc.com, 1999-2000.
Lynn Thomas, The Profitable Power of Cross-Selling and Up-Selling, Oct. 1998, Rough Notes.
Bob Leduc, How to Increase Your Profits with an "Upselling Offer," Copyright 1999.
Larry Dotson, Top 7 Upsell Strategies that Will Increase Your Profits, Mar. 2, 2000, Top7Business.com.
Sheri Cyprus, What is Up-Selling, Copyright 2003-2010, Conjecture Corporation.
"Buying and selling a car online," Meredith Little. Macauthority. Sep. 1999.
Autobytel.com screen shots from www.archive.org archived on Oct. 19, 1996.
Press release dated Sep. 30, 1996, "No-Hassle, No-Haggle Car Buying on the Internet," extracted from Autobytel.com on Jul. 9, 2003.
Press release dated Feb. 7, 1999, "Autobytel.com Inc. to launch online wholesale auction program," extracted from Autobytel.com on Jul. 9, 2003.
Press release dated Feb. 10, 1996, "Autobytel.com teams with Microsoft carsource to offer one-stop online car shopping," extracted from Autobytel.com on Jul. 9, 2003.
Anon., "Ford Finds that Viewdata Gives You More," Information Management, pp. 4-6, Feb. 1985.
O Leary, M., "CompuServe is 'Loaded' with Online Car Info," Online, vol. 19, No. 6, pp. 70-71, Nov./Dec. 1995.
Microsoft Press Computer Dictionary, Third Edition, Microsoft Press, Redmon, 1997, pp. 194 and 459.
The Gale Group, "Calico Guides Online Car Buyers Direct to European Dealers," M2 Presswire, Nov. 5, 1999.
Little, Meredith, Buying and selling a car online, Real world Mac, Sep. 1999.
eSurvey, Auto sales online, Internet & electronic commerce strategies, May 1999, 3 pages.
Business Wire, Autoweb.com corporate profile, 1999 Piper Jaffray conference, 2 pages.
Autoconnect.com, http://web.archive.org/web/19981212012714/http://autoconnect.com/, dated Dec. 12, 1998.
The McGraw Hill, "Concentra Releases Software for Automating Sales Product Configuration," Aviation Daily, vol. 321, No. 11, p. 92, Jul. 19, 1995.
Neuborne, E., et al., "Branding on the Net: The Old Rules Don't Apply. So How do you Hustle Those Wares Online?" Business Week, No. 3603, Nov. 9, 1998, p. 76.
Restriction Requirement mailed in related U.S. Appl. No. 09/770,137 on Jun. 17, 2003.
Response to Restriction Requirement in related U.S. Appl. No. 09/770,137 filed on Sep. 22, 2003.
Non-Final OA mailed in related U.S. Appl. No. 09/770,137 on Aug. 23, 2007.
Response to Non-Final OA in related U.S. Appl. No. 09/770,137 filed on Feb. 25, 2008.
Final OA mailed in related U.S. Appl. No. 09/770,137 on Sep. 22, 2008.
RCE filed in related U.S. Appl. No. 09/770,137, along with an RCE Submission, on Mar. 23, 2009.
Non-Final OA mailed in related U.S. Appl. No. 09/770,137 on Jun. 11, 2009.
Response to Non-Final OA mailed in related U.S. Appl. No. 09/770,137 filed on Dec. 11, 2009.
Final OA mailed in related U.S. Appl. No. 09/770,137 on Mar. 4, 2010.
RCE filed in related U.S. Appl. No. 09/770,137, along with an RCE Submission, on Oct. 13, 2010.
Non-Final OA mailed in related U.S. Appl. No. 09/770,137 on Dec. 23, 2010.
Response to Non-Final OA mailed in related U.S. Appl. No. 09/770,137 filed on Jun. 23, 2011.
Final OA mailed in related U.S. Appl. No. 09/770,137 on Nov. 2, 2011.
Non-Final Office Action dated Apr. 15, 2009, mailed in U.S. Appl. No. 11/533,164, pp. 1-17.
Response to Non-Final Office Action dated Apr. 15, 2009, as filed in U.S. Appl. No. 11/533,164, dated Oct. 15, 2009, pp. 1-46.
Final Office Action dated Jan. 15, 2010, mailed in U.S. Appl. No. 11/533,164, pp. 1-11.
Request for Continued Examination (RCE), RCE submission, and Terminal Disclaimers as filed in U.S. Appl. No. 11/533,164, dated Jul. 9, 2010, pp. 1-16.
Terminal Disclaimer Review Decision dated Jul. 27, 2010, mailed in U.S. Appl. No. 11/533,164, p. 1.
Terminal Disclaimers as filed in U.S. Appl. No. 11/533,164, dated Nov. 5, 2010, pp. 1-4.
Terminal Disclaimer Review Decision dated Nov. 29, 2010, mailed in U.S. Appl. No. 11/533,164, p. 1.
Final Office Action dated Dec. 3, 2010, mailed in U.S. Appl. No. 11/533,164, pp. 1-12.
Response to a Final Office Action and Terminal Disclaimer dated Dec. 3, 2010, as filed in U.S. Appl. No. 11/533,164, dated Jun. 3, 2011, pp. 1-13.
Final Office Action dated Jun. 29, 2011, mailed in U.S. Appl. No. 11/533,164, pp. 1-10.
Terminal Disclaimer Review Decision dated Sep. 30, 2011, mailed in U.S. Appl. No. 11/533,164, p. 1.
Response to a Final Office Action dated Jun. 29, 2011, as filed in U.S. Appl. No. 11/533,164, dated Nov. 29, 2011, pp. 1-11.
Advisory Action dated Dec. 12, 2011, mailed in U.S. Appl. No. 11/533,164, pp. 1-3.
Request for Continued Examination (RCE) and RCE Submission as filed in U.S. Appl. No. 11/533,164, dated Dec. 25, 2011, pp. 1-16.
Final Office Action dated Feb. 15, 2012, mailed in U.S. Appl. No. 11/533,164, pp. 1-11.
Notice of Appeal and Pre-Appeal Brief Request as filed in U.S. Appl. No. 11/533,164, dated Aug. 15, 2012, pp. 1-9.
Terminal Disclaimers as filed in U.S. Appl. No. 11/533,164, dated Aug. 15, 2012, pp. 1-4.
Pre-Brief Appeal Conference Decision dated Sep. 13, 2012, mailed in U.S. Appl. No. 11/533,164, pp. 1-2.
Appeal Brief as filed in U.S. Appl. No. 11/533,164, dated Mar. 15, 2013, pp. 1-20.
Examiner's Answer to Appeal Brief dated Dec. 9, 2013, mailed in U.S. Appl. No. 11/533,164, pp. 1-10.
Reply Brief as filed in U.S. Appl. No. 11/533,164, dated Feb. 10, 2014, pp. 1-6.
Terminal Disclaimer Review Decision dated Aug. 22, 2012, mailed in U.S. Appl. No. 11/533,164, p. 1.
TSA Gateway Purchasing Manual, Dec. 1993, pp. 1-322, Technical Services Associates, Inc., Mechanicsburg, PA.
TSA Gateway System Management Manual, Dec. 1993, pp. 1-262, Technical Services Associates, Inc., Mechanicsburg, PA.
TSA Gateway Inventory Processes User Manual, Dec. 1993, pp. 1-148, Technical Services Associates, Inc., Mechanicsburg, PA.
TSA Gateway DOS, 1992, pp. 1-29, Technical Services Associates, Inc., Mechanicsburg, PA.
Purchasing: The Problems . . . The Potential, Date Unknown, pp. 1-17, Bellwether Software Corporation, Louisville, KY.
Maddox, Kate with Blankenhorn, Dana, Web Commerce: Building a Digital Business, www.Upside.com, 1998, pp. 1-12, John Wiley & Sons, Inc., New York, NY.
J-Con Manual, Apr. 1994, pp. 1-545, Cooperative Computing, Inc., Austin, TX.
Neches, Anna-Lena, Fast-A Research Project in Electronic Commerce, EM-Electronic Markets, Oct. 1993, pp. 25-27, No. 9-10, Newsletter of the Competence Centre Electronic Markets—University of St. Gallen—Institute for Information Management.
EDI Interface User's Guide, Version 10.0, Date Unknown, pp. 1-19, American Tech, Inc.
Patent Owner Post Action Closing Prosecution Submission dated May 2, 2011 as filed in reexamination of U.S. Pat. No. 7,069,235, pp. 1-35.

(56) References Cited

OTHER PUBLICATIONS

Lyons, Daniel, The New Face of Artificial Intelligence, Forbes.com, Nov. 30, 1998, available online Mar. 2, 2010, pp. 1-4.
Response to Final Office Action dated Nov. 2, 2011, as filed in U.S. Appl. No. 09/770,137, dated Mar. 2, 2012, pp. 1-14.
Advisory Action dated Mar. 9, 2012, mailed in U.S. Appl. No. 09/770,137, pp. 1-3.
Request for Continued Examination (RCE) and RCE Submission as filed in U.S. Appl. No. 09/770,137, dated Apr. 2, 2012, pp. 1-17.
Non-final Office Action dated May 20, 2013, mailed in U.S. Appl. No. 09/770,137, pp. 1-38.
Response to Non-final Office Action dated May 20, 2013, as filed in U.S. Appl. No. 09/770,137, dated Nov. 20, 2013, pp. 1-11.
Final Office Action dated Dec. 20, 2013, mailed in U.S. Appl. No. 09/770,137, pp. 1-10.
Request for Continued Examination (RCE) and RCE Submission as filed in U.S. Appl. No. 09/770,137 dated Jun. 20, 2014, pp. 1-17.
Autoconnect.com, http://web.archive.org/web/19981212012714/http://autoconnect.com, dated Dec. 12, 1998.
e-Quisitions Inc. Announces Inaugural Install of Its Flagship Product e-Quinox. Canada Newswire. Ottawa. Feb. 4, 2002, pp. 1-2.
Final Office Action dated May 4, 2017, mailed in U.S. Appl. No. 09/770,137, pp. 1-20.
Response to Notice of Non-Compliant Amendment dated Dec. 15, 2016, as filed in U.S. Appl. No. 09/770,137, pp. 1-12.
Response to Non-Final Office Action dated Apr. 11, 2016, as filed in U.S. Appl. No. 09/770,137, dated Sep. 12, 2016, pp. 1-20.
Non-Final Office Action dated Apr. 11, 2016, mailed in U.S. Appl. No. 09/770,137, pp. 1-12.
Request for Continued Examination (RCE) and RCE Submission as filed in U.S. Appl. No. 09/770,137, dated Nov. 30, 2015, pp. 1-19.
Advisory Action dated Nov. 6, 2015, mailed in U.S. Appl. No. 09/770,137, pp. 1-3.
Response to Final Office Action dated Jun. 29, 2015, as filed in U.S. Appl. No. 09/770,137, dated Oct. 29, 2015, pp. 1-14.
Final Office Action dated Jun. 29, 2015, mailed in U.S. Appl. No. 09/770,137, pp. 1-27.
Response to Non-Final Office Action dated Sep. 16, 2014, as filed in U.S. Appl. No. 09/770,137, dated Mar. 16, 2015, pp. 1-21.
Non-Final Office Action dated Sep. 16, 2014, mailed in U.S. Appl. No. 09/770,137, pp. 1-13.
Request for Continued Examination (RCE) and RCE Submission, as filed in U.S. Appl. No. 09/770,137 dated Nov. 6, 2017, pp. 1-19.

\* cited by examiner

530 — ☑ CARORDER CONTACTS ITS USERS TO PASS ON PRICING UPDATES, SPECIAL SAVINGS, AND PROMOTIONS WHICH BECOME AVAILABLE FOR OUR CUSTOMERS. HOWEVER, IF YOU WOULD NOT LIKE TO RECEIVE SUCH MESSAGES, PLEASE CHECK THIS BOX.

532 — ☑ DON'T SHARE MY SPECIFIC INFORMATION WITH REPUTABLE CARORDER.COM PARTNERS.

How did you hear about carOrder.com?*

- 540 ☐ RADIO AD
- 542 ☐ TELEVISION AD
- 544 ☐ MAGAZINE AD
- 546 ☐ NEWSPAPER AD
- 548 ☐ FRIEND
- 550 ☐ RADIO NEWS STORY
- 552 ☐ TELEVISION NEWS STORY
- 554 ☐ MAGAZINE NEWS STORY
- 556 ☐ NEWSPAPER NEWS STORY
- 558 ☐ OTHER

[CREATE MY ACCOUNT]

Optional Account Information

THE FOLLOWING INFORMATION IS MAINTAINED IN YOUR USER PROFILE. YOU MAY FILL IT OUT NOW, BUT IT'S NOT REQUIRED TO ESTABLISH YOUR ACCOUNT. THIS INFORMATION WILL BE USED WHEN YOU PLACE AN ORDER WITH CARORDER.COM.

Street Address: ⎵ 516

Apartment/Suite: ⎵ 520

City: ⎵ 518

Daytime Phone Number: (☐) ☐-☐  522

Evening Phone Number: (☐) ☐-☐  524

Date of Birth: ☐/☐/☐  526

[CREATE MY ACCOUNT]

| HOME | SITE MAP | HOW IT WORKS | WHY CHOOSE CARORDER.COM? | FAQs | PRIVACY & POLITICS | carOrder.com — RESEARCH CENTER (414) — READY TO BUY (416) — CARORDER SERVICES (418) — MY VIRTUAL GARAGE (420)

VIRTUAL GARAGE: WELCOME TO YOUR VIRTUAL GARAGE CHRIS CONNORS, WHERE YOU'LL SAVE AND RETRIEVE VEHICLES AND THEIR CONFIGURATIONS.   >>EDIT YOUR USER PROFILE

THERE ARE CURRENTLY 24 CARS PARKED IN YOUR VIRTUAL GARAGE   TOTALS: $148,202

2000 MERCEDES SL-CLASS SL600 CONVERTIBLE

CONFIGURED: 06/07/00   VALID UNTIL: 08/15/00
PRICE: $132,904   TAXES & FEES: $15,298
CLICK TO ENLARGE

YOUR OPTIONS: SL600, MANDATORY GAS GUZZLER TAX, CALYPSO GREEN SPECIAL (EXTERIOR COLOR), JAVA SOFT TOP (EXTERIOR ACCENT COLOR), BLACK (INTERIOR COLOR), PRODUCT: SL600, SPECIAL PAINT

CARORDER NOW OFFERS LEASING AND FINANCING THROUGH A SELECT GROUP OF PARTNERS. GET AN ESTIMATE ON A LEASE OR LOAN NOW>>

[COMPARE TO...] [DELETE] [MODIFY] [MY INVOICE] [ORDER]

YOUR ORDERED CARS:

| NAME | Configured | Price | Ordered |
|---|---|---|---|
| 2000 BMW S SERIES S40 I SEDAN | 06/29/00 | $57,015 | 06/29/00 |
| 2000 AUDI S4 QUATTRO SEDAN L | 05/31/00 | $80,706 | 05/31/00 |
| 2000 AUDI A6 2.7T QUATTRO SEDAN | 05/31/00 | $77,918 | 05/31/00 |
| 2000 BMW 7SERIES 750 II SEDAN | 05/15/00 | $15,789 | 05/15/00 |
| 2000 BMW S SERIES 540 I SEDAN | 04/26/00 | $53,620 | 04/26/00 |
| 2000 JAGUAR XK SERIES XKR CONVERTIBLE | 03/01/00 | $82,401 | 03/08/00 |
| 2000 BMW S SERIES 540 IT WAGON | 11/15/99 | $52,105 | 02/09/00 |
| 2000 AUDI A6-4.2 QUATTRO SEDAN | 11/01/99 | $47,561 | 11/09/99 |

YOUR SAVED CARS:

| NAME | Configured | Price* | Expires |
|---|---|---|---|
| 2000 MERCEDES SL-CLASS SL600 CONVERTIBLE | 06/07/00 | $132,904 | 08/15/00 |
| 2000 MERCEDES SL-CLASS SL500 CONVERTIBLE | 05/31/00 | ** | ** |
| 2000 AUDI A4 1.8T AVANT QUATTRO WAGON | 05/24/00 | ** | ** |
| 2000 ACURA INTEGRA GS-R SEDAN | 04/12/00 | ** | ** |
| 2000 ACURA INTEGRA GS-R SEDAN | 04/12/00 | ** | ** |
| 2000 ACURA INTEGRA GS-R SEDAN | 04/12/00 | ** | ** |
| 2000 ACURA INTEGRA GS-R SEDAN | 04/06/00 | ** | ** |
| 2000 BMW 7 SERIES 740 I SEDAN | 03/23/00 | ** | ** |

FIG. 6A

| 2000 MERCEDES E-CLASS E 320 AWD WAGON | 03/23/00 | ** | ** |
|---|---|---|---|
| 2000 BMW-5 SERIES 540 IT WAGON | 03/23/00 | ** | ** |
| 2000 BMW 3 SERIES 323 CI COUPE | 03/23/00 | ** | ** |
| 2000 ACURA INTEGRA LS COUPE | 03/23/00 | ** | ** |
| 2000 ACURA INTEGRA GS-R SEDAN | 03/23/00 | ** | ** |
| 2000 ACURA INTEGRA GS-R COUPE | 03/23/00 | ** | ** |
| 2000 ACURA INTEGRA GS SEDAN | 03/23/00 | ** | ** |
| 2000 ACURA INTEGRA GS COUPE | 03/23/00 | | |

NOTE: DUE TO PERIODIC DATA UPDATES, VEHICLE PRICES MAY FLUCTUATE. CARORDER.COM GUARANTEES PRICES ON CARS SAVED TO YOUR VIRTUAL GARAGE FOR SEVEN DAYS FROM THE DAY THEY WERE ORIGINALLY SAVED. GUARANTEED PRICES EXPIRE AT MIDNIGHT CENTRAL TIME ON THE SEVENTH DAY AFTER THE CARS WERE SAVED.

IF YOU MODIFY A SAVED CONFIGURATION BEFORE THE SEVEN-DAY GUARANTEE HAS EXPIRED, THE CAR'S PRICE WILL BE SUBJECT TO CHANGE AND MAY BE RE-PRICED. UPON SAVING IT TO YOUR VIRTUAL GARAGE, THE NEXT PRICE WILL BE GUARANTEED FOR AN ADDITIONAL SEVEN DAYS.

TYPOGRAPHICAL ERRORS
IN THE EVENT A PRODUCT IS LISTED AT AN INACCURATE PRICE DUE TO TYPOGRAPHICAL ERROR OR ERROR IN PRICING INFORMATION, CARORDER.COM HAS THE RIGHT TO REFUSE OR CANCEL ANY ORDERS PLACED FOR PRODUCT LISTED AT THE INCORRECT PRICE. CARORDER.COM SHALL HAVE THE RIGHT TO REFUSE OR CANCEL ANY SUCH ORDERS WHETHER OR NOT THE ERROR HAS BEEN CONFIRMED.
NOTE: CARORDER.COM PRICING IS BASED ON REGION. CHANGING YOUR ZIP CODE REQUIRES RE-PRICING YOUR CARS.

/-438  /-440  /-442  /-444  /-446  /-448                /-480
CONTACTING US | PRESS | JOBS | TERMS OF USE | AFFILIATE | GLOSSARY    ✉ QUESTIONS @ CARORDER.COM
                                                                ☏ 1.888.657.CARS (2277)

FIG. 6B

402   404   406      408        410      412
HOME | SITE MAP | HOW IT WORKS | WHY CHOOSE CARORDER.COM? | FAQs | PRIVACY & POLITICS carOrder.com | RESEARCH CENTER | READY TO BUY | CARORDER SERVICES | MY VIRTUAL GARAGE
                    414              416           418              420

BROWSE CURRENT MODELS:
LEARN MORE: 2000 JEEP GRAND CHEROKEE

| | |
|---|---|
| | VEHICLE TYPE: 4-DOOR SPORT UTILITY VEHICLE |
| | PERFORMANCE: 4.0L, 196HP 16 |
| | FEATURES: ABS BRAKES, DUAL AIRBAGS, CHILD SAFETY LOCKS |
| CLICK TO ENLARGE | COMPARE TO: HONDA PASSPORT, FORD EXPLORER, NISSAN PATHFINDER |

1000    1020                                       1030
OVERVIEW                    PERFORMANCE | FEATURES

THE JEEP GRAND CHEROKEE IS AVAILABLE IN TWO TRIMLINES, THE LIMITED AND
THE LAREDO, EACH OF WHICH COMES STANDARD WITH DUAL NEXT-GENERATION
AIRBAGS, ANTI-LOCK BRAKES, REMOTE KEYLESS ENTRY, AND CRUISE CONTROL, THE  1010
GRAND CHEROKEE LIMITED ALSO COMES WITH LEATHER SEATS, AN AUXILIARY POWER
OUTLET IN THE CARGO AREA, AND A CD PLAYER. OPTIONS INCLUDE FOUR-
WHEEL DRIVE, POWER BUCKET SEATS AND A SUNROOF.

1070                          1040   1050        1060
LIVE GOT A QUESTION? << ASK HERE | Pick a new Make or Model | continue Build this Car 438   440  442  444      446    448          480
CONTACTING US | PRESS | JOBS | TERMS OF USE | AFFILIATE | GLOSSARY   ✉ QUESTIONS @ CARORDER.COM
                                                              ☎ 1.888.657.CARS (2277)

FIG. 10

| 402 | 404 | 406 | 408 | 410 | 412 |
|---|---|---|---|---|---|
| HOME | SITE MAP | HOW IT WORKS | WHY CHOOSE CARORDER.COM? | FAQs | PRIVACY & POLITICS |

carOrder.com | RESEARCH CENTER | READY TO BUY | CARORDER SERVICES | MY VIRTUAL GARAGE
— 414, 416, 418, 420

 BROWSE CURRENT MODELS:
LEARN MORE: 2000 JEEP GRAND CHEROKEE

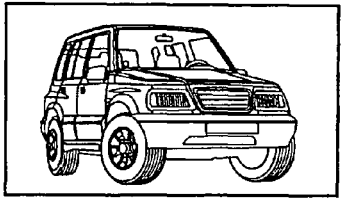

⌕ CLICK TO ENLARGE

VEHICLE TYPE: 4-DOOR SPORT UTILITY VEHICLE
PERFORMANCE: 4.0L, 196HP 16
FEATURES: ABS BRAKES, DUAL AIRBAGS, CHILD SAFETY LOCKS
COMPARE TO: HONDA PASSPORT, FORD EXPLORER, NISSAN PATHFINDER

*1120  1130*
PERFORMANCE                                          OVERVIEW | FEATURES

1110 {
- 4.0L, 195hp I6
- 4.7L, 235hp V8 (opt.)
- AUTOMATIC TRANSMISSION
- TRACTION CONTROL
- ANTI-LOCK BRAKES
- LIVE-AXLE FRONT AND REAR SUSPENSION
}

1100

1070 — 1040 — 1050 — 1060
| LIVE  GOT A QUESTION? << ASK HERE | Pick a new Make or Model | continue | Build this Car |

438  440  442  444  446  448        480
CONTACTING US | PRESS | JOBS | TERMS OF USE | AFFILIATE | GLOSSARY    ✉ QUESTIONS@CARORDER.COM
                                                                    ☏ 1.888.657.CARS (2277)

*FIG. 11*

| HOME | SITE MAP | HOW IT WORKS | WHY CHOOSE CARORDER.COM? | FAQs | PRIVACY & POLITICS | carOrder.com  RESEARCH CENTER | READY TO BUY | CARORDER SERVICES | MY VIRTUAL GARAGE
— 414, 416, 418, 420

BROWSE CURRENT MODELS:
LEARN MORE: 2000 JEEP GRAND CHEROKEE

| VEHICLE TYPE: | 4-DOOR SPORT UTILITY VEHICLE |
| PERFORMANCE: | 4.0L, 196HP I6 |
| FEATURES: | ABS BRAKES, DUAL AIRBAGS, CHILD SAFETY LOCKS |
| COMPARE TO: | HONDA PASSPORT, FORD EXPLORER, NISSAN PATHFINDER |

⊙ CLICK TO ENLARGE

FEATURES           OVERVIEW | PERFORMANCE
                    1220        1230

1210 {
- THEFT DETERRENT SYSTEM
- DUAL AIRBAGS
- ABS BRAKES
- AIR CONDITIONING
- AM/FM CASSETTE STEREO
- PROGRAMMABLE INFORMATION CENTER WITH TRIP COMPUTER, FUEL ECONOMY, AND COMPASS
- 16-INCH ALUMINUM WHEELS
- CRUISE CONTROL
- LIMITED: DUAL 10-WAY POWER FRONT SEATS, LEATHER UPHOLSTERY, CD PLAYER, AUXILIARY POWER OUTLET, REMOTE KEYLESS ENTRY, DUAL-ZONE CLIMATE CONTROL
}

1200

1070 — LIVE | GOT A QUESTION? << ASK HERE
1040 — Pick a new Make or Model
1050
1060 — continue | Build this Car

| CONTACTING US | PRESS | JOBS | TERMS OF USE | AFFILIATE | GLOSSARY |   ✉ QUESTIONS @ CARORDER.COM
438  440  442  444  446  448                                  480
                                                              ☏ 1.888.657.CARS (2277)

| 402 | 404 | 406 | 408 | 410 | 412 |
|---|---|---|---|---|---|
| HOME | SITE MAP | HOW IT WORKS | WHY CHOOSE CARORDER.COM? | FAQs | PRIVACY & POLITICS | carOrder.com  RESEARCH CENTER — 414   READY TO BUY — 416   CARORDER SERVICES — 418   MY VIRTUAL GARAGE — 420

SIDE-BYSIDE-COMPARE:
SELECT VEHICLES TO COMPARE

PLEASE SELECT TWO CARS FOR COMPARISON. CHOOSE FROM BASE MODELS OR SAVED MODELS FROM YOUR VIRTUAL GARAGE.™

VEHICLE ONE

DO YOU WANT TO COMPARE A BASE MODEL OR A SAVED CAR?

⊙ BASE MODEL   ⊙ SAVED MODEL FROM MY VIRTUAL GARAGE™
   —1935          1940—   (YOU MUST BE LOGGED IN AND HAVE CARS SAVED IN YOUR VIRTUAL GARAGE™ TO USE THIS FEATURE.)

PLEASE SELECT A MANUFACTURER, MODEL AND TRIMLINE:

```
       ,-1990              ,-1991              ,-1992
[SELECT A MAKE  ▽]   [SELECT MODEL  ▽]   [SELECT TRIM  ▽]
       —1905              —1910              —1915
```

HOW WOULD YOU LIKE THIS VEHICLE EQUIPPED?

○ BASE EQUIPMENT   ○ WELL EQUIPPED   ○ LOADED
   —1945              —1950              —1955

VEHICLE TWO

DO YOU WANT TO COMPARE A BASE MODEL OR A SAVED CAR?

⊙ BASE MODEL   ○ SAVED MODEL FROM MY VIRTUAL GARAGE™
   —1960          1965—   (YOU MUST BE LOGGED IN AND HAVE CARS SAVED IN YOUR VIRTUAL GARAGE™ TO USE THIS FEATURE.)

PLEASE SELECT A MANUFACTURER, MODEL AND TRIMLINE:

```
       ,-1993              ,-1994              ,-1995
[SELECT A MAKE  ▽]   [SELECT MODEL  ▽]   [SELECT TRIM  ▽]
       —1920              —1925              —1930
```

HOW WOULD YOU LIKE THIS VEHICLE EQUIPPED?

⊙ BASIC EQUIPMENT   ⊙ WELL EQUIPPED   ⊙ LOADED
   —1970               —1975             —1980

1900

| 438 | 440 | 442 | 444 | 446 | 448 | 480 |
|---|---|---|---|---|---|---|
| CONTACTING US | PRESS | JOBS | TERMS OF USE | AFFILIATE | GLOSSARY | ✉ QUESTIONS@CARORDER.COM |

☎ 1.888.657.CARS (2277)

FIG. 19

| 402 | 404 | 406 | 408 | 410 | 412 |
|---|---|---|---|---|---|
| HOME | SITE MAP | HOW IT WORKS | WHY CHOOSE CARORDER.COM? | FAQs | PRIVACY & POLITICS | carOrder.com  RESEARCH CENTER — 414    READY TO BUY — 416    CARORDER SERVICES — 418    MY VIRTUAL GARAGE — 420

SIDE-BYSIDE-COMPARE:
SELECT VEHICLES TO COMPARE

PLEASE SELECT TWO CARS FOR COMPARISON. CHOOSE FROM BASE MODELS OR SAVED MODELS FROM YOUR VIRTUAL GARAGE.™

VEHICLE ONE
DO YOU WANT TO COMPARE A BASE MODEL OR A SAVED CAR?

○ BASE MODEL — 1935    ● SAVED MODEL FROM MY VIRTUAL GARAGE™ — 1940
(YOU MUST BE LOGGED IN AND HAVE CARS SAVED IN YOUR VIRTUAL GARAGE™ TO USE THIS FEATURE.)

PLEASE SELECT A SAVED CAR FROM YOUR VIRTUAL GARAGE:

[SELECT GARAGE CAR ▽] — 2020
— 2010

HOW WOULD YOU LIKE THIS VEHICLE EQUIPPED?

● BASE EQUIPMENT — 1945    ● WELL EQUIPPED — 1950    ● LOADED — 1955

VEHICLE TWO
DO YOU WANT TO COMPARE A BASE MODEL OR A SAVED CAR?

● BASE MODEL — 1960    ○ SAVED MODEL FROM MY VIRTUAL GARAGE™ — 1965
(YOU MUST BE LOGGED IN AND HAVE CARS SAVED IN YOUR VIRTUAL GARAGE™ TO USE THIS FEATURE.)

PLEASE SELECT A MANUFACTURER, MODEL AND TRIMLINE:

[SELECT A MAKE ▽] — 1993/1920    [SELECT MODEL ▽] — 1994/1925    [SELECT TRIM ▽] — 1995/1930

HOW WOULD YOU LIKE THIS VEHICLE EQUIPPED?

● BASIC EQUIPMENT — 1920    ● WELL EQUIPPED — 1925    ● LOADED — 1930

2000

| 438 | 440 | 442 | 444 | 446 | 448 | 480 |
|---|---|---|---|---|---|---|
| CONTACTING US | PRESS | JOBS | TERMS OF USE | AFFILIATE | GLOSSARY | ✉ QUESTIONS@CARORDER.COM |

✆ 1.888.657.CARS (2277)

FIG. 20

| 402 | 404 | 406 | 408 | 410 | 412 |

HOME | SITE MAP | HOW IT WORKS | WHY CHOOSE CARORDER.COM? | FAQs | PRIVACY & POLITICS carOrder.com | RESEARCH CENTER | READY TO BUY | CARORDER SERVICES | MY VIRTUAL GARAGE
414 — 416 — 418 — 420

SIDE-BYSIDE-COMPARE:
SELECT VEHICLES TO COMPARE

PLEASE SELECT TWO CARS FOR COMPARISON. CHOOSE FROM BASE MODELS OR SAVED MODELS FROM YOUR VIRTUAL GARAGE™

VEHICLE ONE

DO YOU WANT TO COMPARE A BASE MODEL OR A SAVED CAR?

◉ BASE MODEL — 1935
◉ SAVED MODEL FROM MY VIRTUAL GARAGE™ — 1940
(YOU MUST BE LOGGED IN AND HAVE CARS SAVED IN YOUR VIRTUAL GARAGE™ TO USE THIS FEATURE.)

PLEASE SELECT A MANUFACTURER, MODEL AND TRIMLINE:

| AUDI ▽ 1990 | 2000 A4 ▽ 1991 | 2.8 QUATTRO SEDAN ▽ 1992 |
| 1905 | 1910 | 1915 |

HOW WOULD YOU LIKE THIS VEHICLE EQUIPPED?

◉ BASIC EQUIPMENT — 1945    ○ WELL EQUIPPED — 1950    ○ LOADED — 1955

VEHICLE TWO

DO YOU WANT TO COMPARE A BASE MODEL OR A SAVED CAR?

◉ BASE MODEL — 1960
◉ SAVED MODEL FROM MY VIRTUAL GARAGE™ — 1965
(YOU MUST BE LOGGED IN AND HAVE CARS SAVED IN YOUR VIRTUAL GARAGE™ TO USE THIS FEATURE.)

PLEASE SELECT A MANUFACTURER, MODEL AND TRIMLINE:

| BMW ▽ 1993 | 2000 3 SERIES ▽ 1994 | 328 I SEDAN ▽ 1995 |
| 1920 | 1925 | 1930 |

HOW WOULD YOU LIKE THIS VEHICLE EQUIPPED?

◉ BASIC EQUIPMENT — 1920    ○ WELL EQUIPPED — 1925    ○ LOADED — 1930

2100          2110 — [ COMPARE... ]

| 438 | 440 | 442 | 444 | 446 | 448 | 480 |
CONTACTING US | PRESS | JOBS | TERMS OF USE | AFFILIATE | GLOSSARY   ✉ QUESTIONS@CARORDER.COM

☏ 1.888.657.CARS (2277)

*FIG. 21*

| 2250 | | 2255 | | 2200 |
|---|---|---|---|---|
| FRONT SEAT TYPE | BUCKET SEATS | FRONT SEAT TYPE | BUCKET SEATS | |
| POWER ADJUSTABLE SEATS | YES | POWER ADJUSTABLE SEATS | YES | |
| HEATED FRONT SEAT | NO | HEATED FRONT SEAT | NO | |
| LUMBAR SUPPORT | YES | LUMBAR SUPPORT | NO | |
| SEATING SURFACES | UPGRADED CLOTH VELOUR | SEATING SURFACES | VINYL | |
| AM/FM STEREO | AM/FM STEREO WITH CD, CASSETTE AND 8 SPEAKERS | AM/FM STEREO | AM/FM STEREO WITH CASSETTE AND 10 SPEAKERS AND RADIO DATA SYSTEM | |
| CASSETTE | YES | CASSETTE | YES | |
| IN-DASH CD | YES | IN-DASH CD | NO | |
| CD CHANGER | NO | CD CHANGER | NO | |
| CELLULAR PHONE | NA | CELLULAR PHONE | NA | |
| TRIP COMPUTER | STANDARD | TRIP COMPUTER | STANDARD | |
| SUNROOF/MOONROOF | NA | SUNROOF/MOONROOF | NA | |
| SAFETY: | | SAFETY: | | |
| SIDE IMPACT AIR BAGS | STANDARD | SIDE IMPACT AIR BAGS | STANDARD | |
| DRIVER SIDE AIR BAGS | STANDARD | DRIVER SIDE AIR BAGS | STANDARD | |
| PASSENGER SIDE AIR BAGS | STANDARD | PASSENGER SIDE AIR BAGS | STANDARD | |
| SEAT BELT PRETENSIONERS | YES | SEAT BELT PRETENSIONERS | NA | |
| ROADSIDE ASSISTANCE | STANDARD | ROADSIDE ASSISTANCE | STANDARD | |
| INTEGRATED CHILD SEATS | NOT AVAILABLE | INTEGRATED CHILD SEATS | NOT AVAILABLE | |
| SECURITY: | | SECURITY: | | |
| ANTITHEFT SYSTEM | STANDARD | ANTITHEFT SYSTEM | NA | |
| BRAKES: | | BRAKES: | | |
| DISC BRAKES | STANDARD | DISC BRAKES | STANDARD | |
| NUMBER OF DISC BRAKES | 4 | NUMBER OF DISC BRAKES | 4 | |
| ABS | STANDARD | ABS | STANDARD | |
| ABS LOCATION | 4 WHEEL | ABS LOCATION | 4 WHEEL | |
| CHASSIS: | | CHASSIS: | | |

| RIM TYPE | ALLOY |
|---|---|
| RIM DIAMETER | 15 |
| RIM WIDTH | 7.0 |
| TIRE RATING | A |
| DIMENSIONS: | |
| OVERALL LENGTH (MM) | 4521 |
| OVERALL WIDTH (MM) | 1762 |
| OVERALL HEIGHT (MM) | 1417 |
| WHEELBASE(MM) | 2606 |
| FRONT TRACK (MM) | 1496 |
| REAR TRACK(MM) | 1476 |
| FRONT HEADROOM | 968 |
| REAR HEADROOM | 935 |
| FRONT LEGROOM | 1049 |
| REAR LEGROOM | 848 |
| INTERIOR VOLUME (l) | 2469 |
| FUEL: | |
| HIGHWAY EPA | 25 |
| CITY EPA | 18 |
| TANK CAPACITY (l) | 54 |
| RECOMMENDED FUEL | UNLEADED PREMIUM |

2250

CONFIGURE
2260

| RIM TYPE | ALLOY |
|---|---|
| RIM DIAMETER | 15 |
| RIM WIDTH | 7.0 |
| TIRE RATING | A |
| DIMENSIONS: | |
| OVERALL LENGTH (MM) | 4470 |
| OVERALL WIDTH (MM) | 1740 |
| OVERALL HEIGHT (MM) | 1415 |
| WHEELBASE(MM) | 2725 |
| FRONT TRACK (MM) | 1473 |
| REAR TRACK(MM) | 1481 |
| FRONT HEADROOM | 975 |
| REAR HEADROOM | 968 |
| FRONT LEGROOM | 1052 |
| REAR LEGROOM | 879 |
| INTERIOR VOLUME (l) | 2571 |
| FUEL: | |
| HIGHWAY EPA | 27 |
| CITY EPA | 18 |
| TANK CAPACITY (l) | 63 |
| RECOMMENDED FUEL | UNLEADED PREMIUM |

2255

CONFIGURE
2265

438 440 442 444 446 448 480
CONTACTING US | PRESS | JOBS | TERMS OF USE | AFFILIATE | GLOSSARY  ✉ QUESTIONS@CARORDER.COM
✆ 1.888.657.CARS (2277)

FIG. 22C

402 404 406 408 410 412
HOME | SITE MAP | HOW IT WORKS | WHY CHOOSE CARORDER.COM? | FAQs | PRIVACY & POLITICS

HOW IT WORKS | ABOUT US | PRIVACY POLICY carOrder.com™   RESEARCH CENTER | READY TO BUY | CARORDER SERVICES | MY VIRTUAL GARAGE
                         414              416            418              420

READY TO BUY:
SELECT MY COLORS

2000 BMW 3 SERIES 328 i SEDAN

CLICK TO ENLARGE

| | INVOICE* | MSRP | CARORDER |
|---|---|---|---|
| | $30,220 | $33,400 | $32,888 |

✓ INCLUDED WITH YOUR SELECTION   ⊕ CONFLICTS WITH A CURRENT SELECTION BUT YOU MAY SELECT?

READY TO BUY:
- ⊙ SELECT MY COLORS
- SELECT MY OPTIONS
- EXTENDED SERVICE CONTRACTS
- PAYMENT ESTIMATION
- SEE WHAT COMES STANDARD

← SELECT A NEW:
- MANUFACTURER
- MODEL
- TRIMLINE/STYLE

READ OUR PRICING GUARANTEE

EXTERIOR COLOR — 2320(1)    INTERIOR COLOR
⊕ ○ ☐ STEEL GRAY METALLIC   ○ ☐ GRAY — 2320(11)
                 2320(2)
⊕ ○ ☐ LIGHT YELLOW METALLIC  ⊙ ☐ BLACK — 2320(12)
                 2320(3)
⊕ ○ ☐ SIENNA RED METALLIC    ○ ☐ TAN IN RED — 2320(13)
                 2320(4)
⊕ ○ ☐ ORIENT BLUE METALLIC   ○ ☐ SAND — 2320(14)
                 2320(5)
⊕ ○ ☐ STEEL BLUE METALLIC
                 2320(6)
⊕ ○ ☐ FERN GREEN METALLIC
                 2320(7)
⊕ ○ ☐ TITANIUM SILVER METALLIC
                 2320(8)
○ ☐ ALPINE WHITE CLEARCOAT
                 2320(9)
⊙ ☐ JET BLACK CLEARCOAT
                 2320(10)
○ ☐ BRIGHT RED CLEARCOAT

*THE INVOICE PRICE IS THE PUBLISHED PRICE OF THE VEHICLE FROM THE MANUFACTURER TO THE DEALER. DUE TO DEALER HOLDBACKS AND INCENTIVES, THIS PRICE MAY BE DIFFERENT THAN THE DEALER'S ACTUAL COST FOR THE VEHICLE. LEARN MORE ABOUT INVOICE PRICING.

DUE TO THE CAPABILITIES OF YOUR SOFTWARE, COMPUTER, OR MONITOR, THE COLORS YOU SEE ABOVE MAY DIFFER FROM THE ACTUAL VEHICLE COLORS OFFERED. SOME OF THE MANUFACTURER'S COLOR SAMPLES ARE UNAVAILABLE TO US, AND THEREFORE DO NOT SHOW UP ON THE PAGE.

1070                           2310                    2330
LIVE GOT A QUESTION? << ASK HERE    Save To My Virtual Garage    continue  Pick My Options 438    440  442   444      446      448            480
CONTACTING US | PRESS | JOBS | TERMS OF USE | AFFILIATE | GLOSSARY   ✉ QUESTIONS @ CARORDER.COM
                                                              ☏ 1.888.657.CARS (2277)

FIG. 23

| 402 | 404 | 406 | 408 | 410 | 412 |
|---|---|---|---|---|---|
| HOME | SITE MAP | HOW IT WORKS | WHY CHOOSE CARORDER.COM? | FAQs | PRIVACY & POLITICS | carOrder.com

| RESEARCH CENTER | READY TO BUY | CARORDER SERVICES | MY VIRTUAL GARAGE |
|---|---|---|---|
| 414 | 416 | 418 | 420 |

READY TO BUY:
SELECT MY COLORS

2000 BMW 3 SERIES 328 i SEDAN
CLICK TO ENLARGE

| | INVOICE* | MSRP | CARORDER |
|---|---|---|---|
| | $30,220 | $33,400 | $32,888 |

⊘ INCLUDED WITH YOUR SELECTION ① CONFLICTS WITH A CURRENT SELECTION BUT YOU MAY SELECT?

READY TO BUY:
- ⦿ SELECT MY COLORS
- SELECT MY OPTIONS
- EXTENDED SERVICE CONTRACTS
- PAYMENT ESTIMATION
- SEE WHAT COMES STANDARD

← SELECT A NEW:
MANUFACTURER
MODEL
TRIMLINE/STYLE

READ OUR
PRICING GUARANTEE

2410(1)-(N)

| TRIM | |
|---|---|
| ⊘ ☑ 328 i | $32,888 |
| EMISSIONS | |
| ☐ CALIFORNIA EMISSIONS | NO CHRG |
| SEATS | |
| ☐ SPLIT FOLD DOWN REAR SEATS | $425 |
| ☐ HEATED FRONT SEATS WITH THERMOSTAT CONTROL | $446 |
| ☐ LEATHER TRIM | $1,297 |
| PACKAGES | |
| ☐ SPORT PACKAGE -INCLUDES SPORT SUSPENSION, LEATHER-WRAPPED MULTI-FUNCTION SPORT STEERING WHEEL, 17 INCH SPORT STAR-SPOKE ALLOY WHEELS, P225/4SWR17 PERFORMANCE TIRES, 8-WAY POWER FRONT SPORT SEATS WITH DRIVER MEMORY | $1,208 |
| ☐ PREMIUM PACKAGE -INCLUDES POWER GLASS MOONROOF, AUTO-DIMMING REARVIEW MIRROR, MYRTLE WOOD TRIM, FRONT SEAT 4-WAY POWER LUMBAR SUPPORT, RAIN-SENSING WINDSHIELD WIPERS, LEATHER SEAT TRIM | $2,588 |
| OTHER ACCESSORIES | |
| ☐ PARK DISTANCE CONTROL | $315 |
| ☐ MYRTLE WOOD TRIM | $446 |
| ☐ XENON HEADLIGHTS WITH AUTO-LEVELING | $446 |
| ☐ POWER TILT/SLIDE GLASS MOONROOF | $940 |
| ☐ INTEGRATED ONBOARD GPS NAVIGATION SYSTEM -INCLUDES COLOR MONITOR, 8-FUNCTION ONBOARD COMPUTER, ONE GEOGRAPHIC CD, ONE 6-MONTH UPDATE | $1,607 |

FIG. 24A

| | TRANSMISSION | |
|---|---|---|
| 1210(1)-(N) | ☐ 5-SPEED ELECTRICALLY-CONTROLLED AUTOMATIC TRANSMISSION WITH OVERDRIVE AND STEPTRONIC SHIFTING | $1,271 |
| | AUDIO | |
| | ☐ IN-DASH CD PLAYER -REPLACES STANDARD CASSETTE PLAYER | $179 |
| | ☐ HARMON KARDON SOUND SYSTEM -INCLUDES 10-SPEAKERS WITH 2 SUB-WOOFERS, SPEED SENSITIVE EQUILIZATION, UPGRADED AMPLIFICATION | $604 |

*THE INVOICE PRICE IS THE PUBLISHED PRICE OF THE VEHICLE FROM THE MANUFACTURER TO THE DEALER. DUE TO DEALER HOLDBACKS AND INCENTIVES, THIS PRICE MAY BE DIFFERENT THAN THE DEALERS ACTUAL COST FOR THE VEHICLE. LEARN MORE ABOUT INVOICE PRICING.

DUE TO THE CAPABILITIES OF YOUR SOFTWARE, COMPUTER, OR MONITOR, THE COLORS YOU SEE ABOVE MAY DIFFER FROM THE ACTUAL VEHICLE COLORS OFFERED. SOME OF THE MANUFACTURERS COLOR SAMPLES ARE UNAVAILABLE TO US, AND THEREFORE DO NOT SHOW UP ON THE PAGE.

―1070  ―2420  ―2430
[LIVE] GOT A QUESTION? <<ASK HERE   [Pick a new Make or Model]   [continue][Build this Car]

―438 ―440 ―442 ―444 ―446 ―448 ―480
CONTACTING US | PRESS | JOBS | TERMS OF USE | AFFILIATE | GLOSSARY   ✉ QUESTIONS@CARORDER.COM
☏ 1.888.657.CARS (2277)

SYSTEM AND METHOD FOR FACILITATING COMMERCIAL TRANSACTIONS OVER A DATA NETWORK

CROSS-REFERENCE TO RELATED APPLICATIONS

This application is a continuation of patent application Ser. No. 09/770,522, entitled "SYSTEM AND METHOD FOR FACILITATING COMMERCIAL TRANSACTIONS OVER A DATA NETWORK," filed Jan. 26, 2001 now abandoned and having J. Walsky as inventor, which is a continuation-in-part of patent application Ser. No. 09/760,061 entitled "SYSTEM AND METHOD FOR FACILITATING COMMERCIAL TRANSACTIONS OVER A DATA NETWORK," filed Jan. 12, 2001 now U.S. Pat. No. 7,206,756 and having J. Walsky as inventor (which claims priority to Provisional Patent Application No. 60/176,117, entitled "SYSTEM AND METHOD FOR FACILITATING COMMERCIAL TRANSACTIONS OVER A DATA NETWORK," filed Jan. 14, 2000 and having J. Walsky and S. Aboel-Nil as inventors); and is related to patent application Ser. No. 09/760,062 (filed Jan. 12, 2001) and Ser. No. 09/770,137 (filed Jan. 26, 2001), both entitled "METHOD AND APPARATUS FOR PRODUCT COMPARISON," and both having C. Connors, A. Miller, J. Walsky, J. Van Dyke, J. Singh and A. Leamon as inventors, and patent application Ser. No. 09/760,059 (filed Jan. 12, 2001) and Ser. No. 09/770,694 (filed Jan. 26, 2001), both entitled "METHOD AND APPARATUS FOR SORTING PRODUCTS BY FEATURES," and both having C. Connors, A. Miller, J. Walsky, J. Van Dyke, J. Singh and A. Leamon as inventors. These applications are assigned to Trilogy Development Group, Inc., the assignee of the present invention, and are hereby incorporated by reference, in their entirety and for all purposes.

BACKGROUND OF THE INVENTION

Field of the Invention

The present invention relates to transacting commerce over a network, and, more particularly, to a method and apparatus for processing information related to such commercial transactions.

Description of the Related Art

Historically, information regarding commercially available products has been disseminated using various types of well-known media, including print, radio, television and the like. The operation of such media has been patently obvious, and its use self-evident. With the advent of the Internet, a wide array of product information has become even more accessible to the average person.

Entities providing such product information have been assisted in their endeavor by networking and client/server technology that has become available in approximately the last ten to fifteen years. Such client/server arrangements typically allow a number of users employing client terminals to communicate with a remote server computer in order to transfer information therebetween. This information may include text, data in any one of a number of formats, graphical information, streaming audio and video, and other such information. To facilitate such transfers, client terminals can employ a "web" browser that provides access to a server via a graphical user interface (GUI). The server responds to requests from the client by providing information in the form of a "web page." One popular collection of servers uses Hypertext Transfer Protocol (HTTP) to provide information. This assemblage is known as the "World Wide Web" (WWW). A collection of related web pages is often referred to as a "website," or more simply a "site." The information is typically presented as web pages written as text with standardized formatting and control symbols known as Hypertext Mark-up Language (HTML). HTML provides basic hypertext document formatting and allows a server to specify "links" to other servers and files. Use of an HTML-compliant browser involves specification of a link via a Uniform Resource Locator (URL). Upon such specification, the user's client terminal makes a TCP/IP request to the server identified in the link and receives an HTML file that is interpreted by the browser so that an electronic HTML document made up of one or more web pages may be displayed on the client's terminal.

Unfortunately, however, the use of such functionality for the selection and purchase of products is less than ideal. This is especially true in the case where comparable products exist. Especially when faced with a large number of comparable products, it is natural for a consumer to want to compare such products (e.g., in side-by-side fashion), in order to better understand the differences between the products, and the advantages of each. Moreover, when making such comparisons, and when employing web-based technology in general, reducing the need for user interaction can improve a website's ability to handle increased traffic, and ultimately, the consumer's buying experience.

SUMMARY OF THE INVENTION

Embodiments of the present invention address limitations that exist in the field by allowing a user to easily store (and retrieve) product-related information. Once a user has configured a product (or has identified a product configuration) that the user wishes to store, the user can simply store the configured product (or product configuration) without having to re-enter configuration information.

In one embodiment of the present invention, a method, a computer system and a computer program product to facilitate comparison-price shopping over a data network, such as the Internet, are provided that includes a price availability feature guaranteeing a price of a product associated with product-related information stored on a server. The information typically includes offered price data. A server is provided that includes a number of addresses in an address space, and a subportion of those addresses is associated with an identification code. Acceptance of the offered price data is achieved by storing the information in the subportion, defining an agreed price data. The agreed price data is maintained in the absence of a predetermined system event. In one embodiment, the predetermined system event may include an expiration of a preset amount of time. Alternatively, the predetermined system event may include dissociating information from the subportion of the addresses. Although the product-related information may correspond to any known product, the present invention is discussed with respect to product-related information regarding automobiles.

In another embodiment of the present invention, a method for managing information regarding a product is disclosed. The method includes selecting a selected feature from a number of such features and storing the information. The product can be configured with at least one of the features. The information includes the selected feature.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIGS. 5A and 5B are a plan view of a web page employed to allow users to register in order to gain access to the present invention.

FIGS. 6A and 6B are a plan view of a web page that is uniquely associated with a user and on which product-related information stored on a server is accessed, in accordance with the present invention.

FIG. 10 is a plan view of a web page through which a user can access product-related information for a selected product according to embodiments of the present invention.

FIG. 11 is a plan view of a page through which a user can access product-related performance information for a selected product according to embodiments of the present invention.

FIG. 12 is a plan view of a web page through which a user can access product-related feature information for a selected product according to embodiments of the present invention.

FIG. 17 is a plan view of a web page that allows a user to identify a desired product by interior characteristics according to embodiments of the present invention.

FIG. 19 is a first plan view of a web page that allows a user to enter information regarding products to be compared according to embodiments of the present invention.

FIG. 20 is a second plan view of a web page that allows a user to enter information regarding products to be compared according to embodiments of the present invention.

FIG. 21 is a third plan view of a web page that allows a user to enter information regarding products to be compared according to embodiments of the present invention.

FIG. 23 is a plan view of a web page that allows a user to select product characteristics according to embodiments of the present invention.

FIG. 24 is a plan view of a web page that allows a user to select product features according to embodiments of the present invention.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention facilitates commercial transactions over a network such as the Internet. More specifically, embodiments of the present invention facilitate shopping (especially comparison-price shopping) over a network (e.g., the Internet) by allowing a user to easily store information regarding one or more products. The present invention does so by allowing a user to easily store (and retrieve) product-related information. Once a user has configured a product (or has identified a product configuration) that the user wishes to store, the user can simply store the configured product (or product configuration) without having to re-enter configuration information. This simplifies the user's interaction with the system (and so the purchasing process), improving the user's shopping experience and increasing the likelihood that the user will purchase the given product(s).

Also included is a price availability feature that guarantees a price of a product associated with product-related information stored on a server. To that end, information concerning a given product is typically rendered on a display (e.g., a browser window). The information rendered typically includes data regarding the price at which a given product is offered. A server is typically employed to provide centralized storage of product information. A subportion of that storage is associated with an identification code. Acceptance of the offered price data is effected by storing the information in the subportion, and so defining an agreed price. The agreed price is maintained on the server in the absence of a predetermined system event. In a first embodiment, the predetermined system event may include an expiration of a preset amount of time. Alternatively, the predetermined system event may include dissociating the information from the subportion of storage. Although the product-related information may correspond to any known product, the present invention is discussed with respect to product-related information regarding automobiles, as will be seen in the subsequent discussion.

An Example Computing and Network Environment

Figure 1:
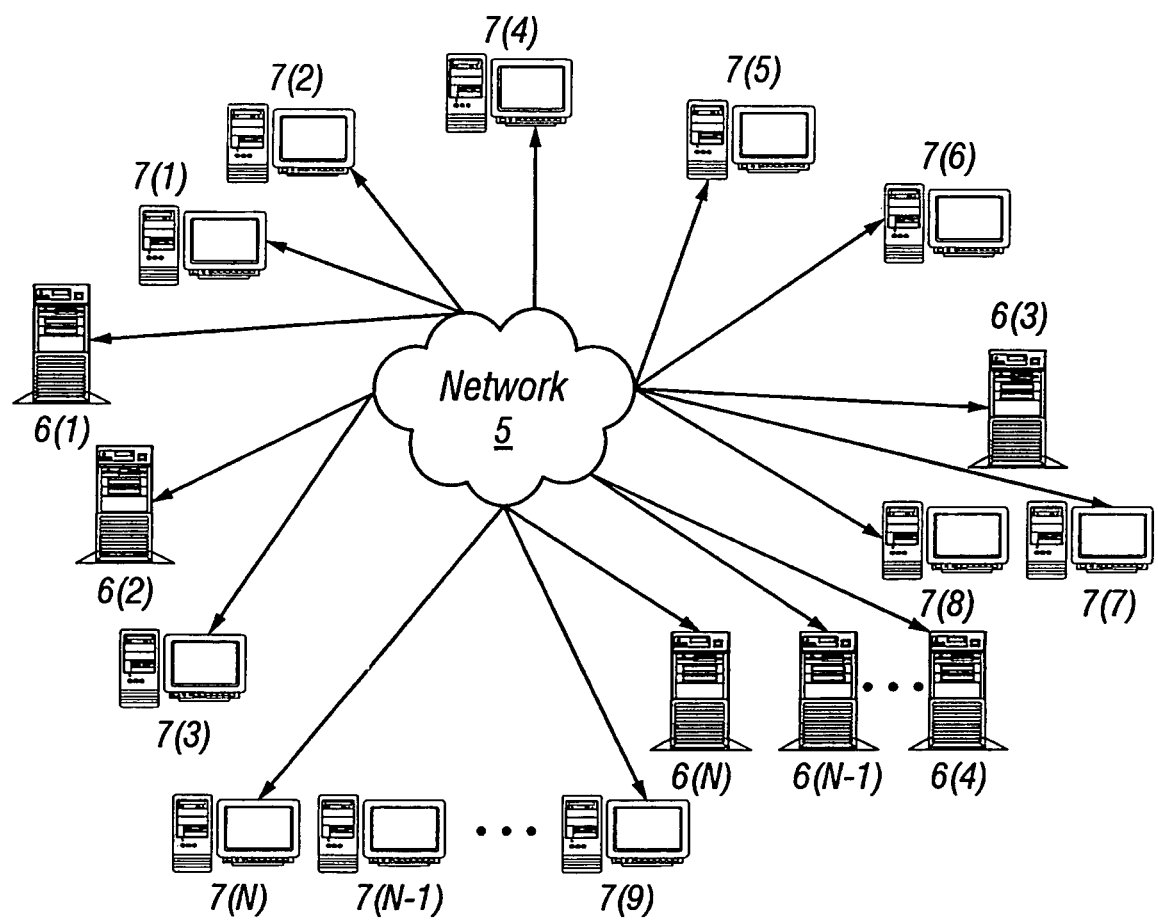
FIG. 1 is a block diagram illustrating a network environment in which commercial transaction processing according to embodiments of the present invention may be practiced.

FIG. 1 is a block diagram illustrating a network environment in which a commercial transaction processing system according to the present invention may be practiced. As is illustrated in FIG. 1, network 5, such as a private wide area network (WAN) or the Internet, includes a number of networked servers 6(1)-(N) that are accessible by client terminals 7(1)-(N). Communication between client terminals 7(1)-(N) and servers 6(1)-(N) typically occurs over a publicly accessible network, such as a public switched telephone network over ADSL telephone lines or large bandwidth trunks, for example communications channels providing TI or OC3 service. Client terminals 7(1)-(N) access servers 6(1)-(N) through a service provider, e.g., an Internet service provider such as America On-Line™, Prodigy™, CompuServe™ and the like, by executing application specific software, commonly referred to as a browser, on one of client terminals 7(1)-(N).

One or more of client terminals 7(1)-(N) and/or one or more of servers 6(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e. peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client terminals 7(1)-(N) is shown in detail in FIG. 2.

Figure 2:
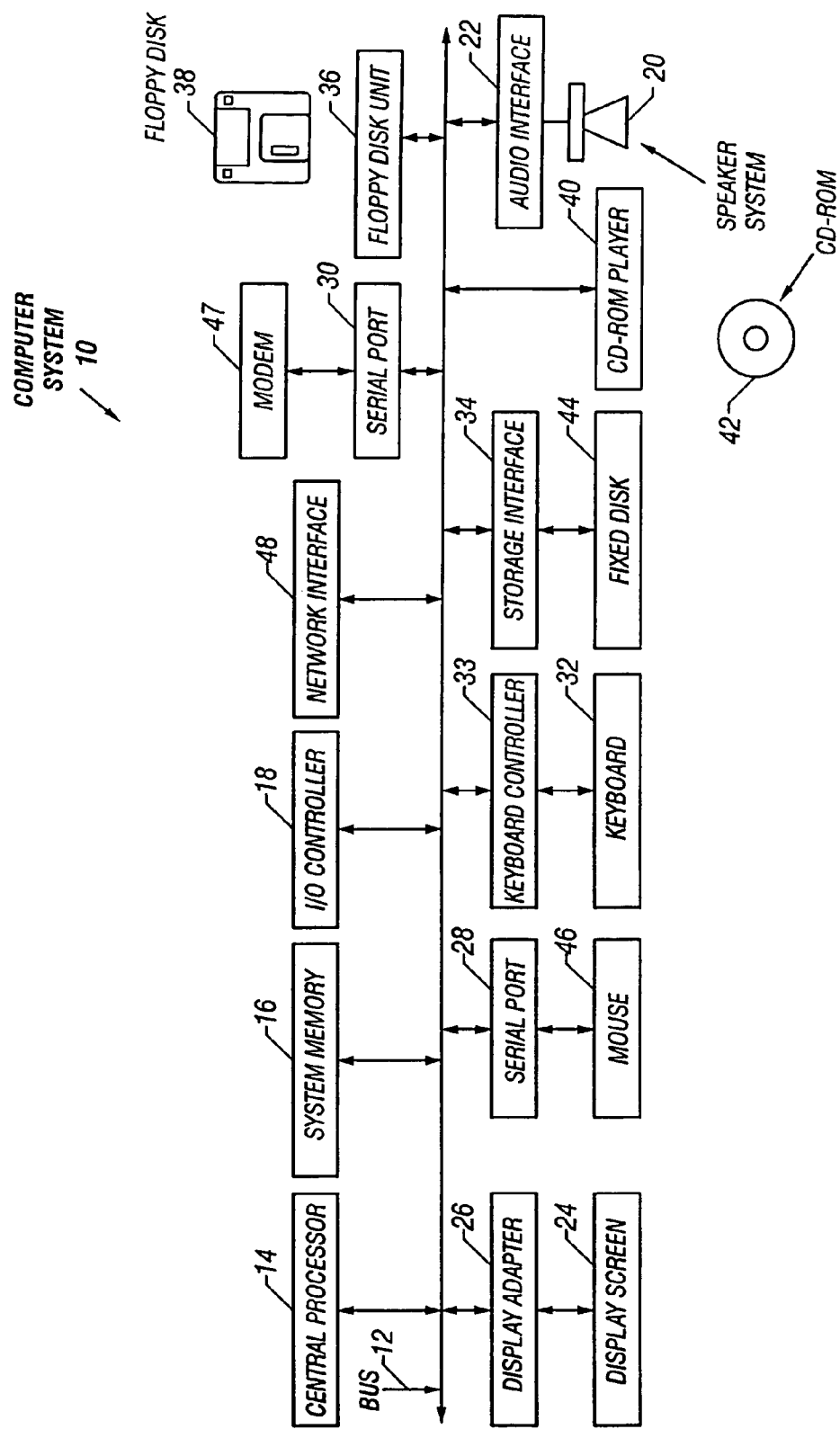
FIG. 2 depicts a block diagram of a computer system suitable for implementing embodiments of the present invention.

FIG. 2 depicts a block diagram of a computer system 10 suitable for implementing the present invention, and example of one or more of client terminals 7(1)-(N). Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 2 to be present to practice the present invention. The devices and subsystems may be interconnected in different ways from that shown in FIG. 2. The operation of a computer system such as that shown in FIG. 2 is readily known in the art and is not discussed in detail in this application. Code to implement the present invention may be operably disposed or stored in computer-readable storage media such as one or more of system memory 16, fixed disk 44, CD-ROM 42, or floppy disk 38. Additionally, computer system 10 may be any kind of computing device, and so includes personal data assistants (PDAs), network appliance, X-window terminal or other such computing device. The operating system provided on computer system 10 may be MS-DOS®, MS-WINDOWS®, OS/2®, UNIX®, Linux® or other known operating system. Computer system 10 also supports a number of Internet access tools, including, for example, an HTTP-compliant web browser having a JavaScript interpreter, such as Netscape Navigator® 3.0, Microsoft Explorer® 3.0 and the like.

It will be noted that the variable identifier "N" is used in several instances in FIG. 2 to more simply designate the final element (e.g., servers 6(1)-(N) and client terminals 7(1)-(N)) of a series of related or similar elements (e.g., servers and client terminals). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 10). It is to be understood that such depicted architectures are merely example, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 3:
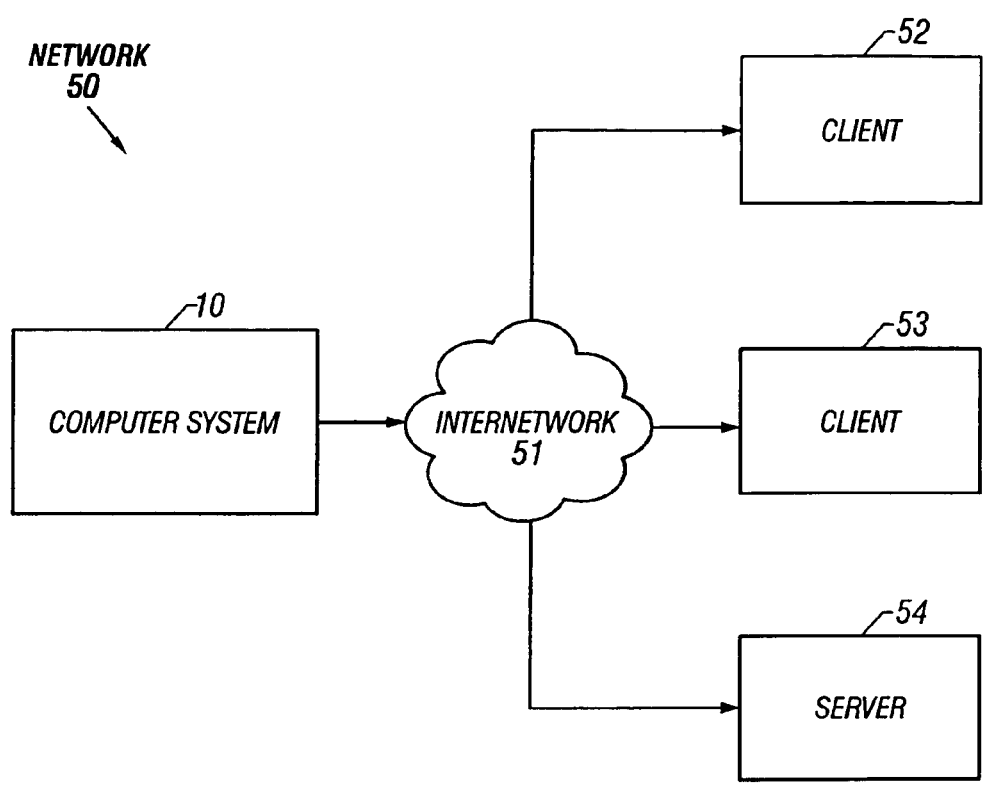
FIG. 3 depicts the interconnection of the computer system of FIG. 2 to client and host systems.

FIG. 3 is a block diagram depicting a network 50 in which computer system 10 is coupled to an internetwork 51, which is coupled, in turn, to client systems 52 and 53, as well as a server 54. Internetwork 51 (e.g., the Internet) is also capable of coupling client systems 52 and 53, and server 54 to one another. With reference to computer system 10, modem 47, network interface 48 or some other method can be used to provide connectivity from computer system 10 to internetwork 51. Computer system 10, client system 52 and client system 53 are able to access information on server 54 using, for example, a web browser (not shown). Such a web browser allows computer system 10, as well as client systems 52 and 53, to access data on server 54 representing the pages of a website hosted on server 54. Protocols for exchanging data via the Internet are well known to those skilled in the art. Although FIG. 3 depicts the use of the Internet for exchanging data, the present invention is not limited to the Internet or any particular network-based environment.

Referring to FIGS. 1, 2 and 3, a browser running on computer system 10 employs a TCP/TP connection to pass a request to server 54, which can run an HTTP "service" (e.g., under the WINDOWS® operating system) or a "daemon" (e.g., under the UNIX® operating system), for example. Such a request can be processed, for example, by contacting an HTTP server 10a at the following address "http://www.carOrder.com," employing a protocol that can be used to communicate between the server 10a and the client terminal 12. The HTTP server 10 then responds to the protocol, typically by sending a "web page" formatted as an HTML file. The browser interprets the HTML file and may form a visual representation of the same using local resources, e.g., fonts and colors.

Referring to FIGS. 1, 2 and 3, server 54 (which includes an HTTP server, as previously noted) can further include a web server (not shown), an application server (also not shown) and a database server operating with an open distributed object computing infrastructure such as Common Object Request Broker Architecture (CORBA) (also not shown). The web server can include a user interface layer and a centralized dispatch mechanism, both of which are typically implemented employing Java Server Pages (JSP).

One advantage of employing JSP is that the use of JSP facilitates organization of a website as a state machine. In this manner, the logical organization of a website can be arranged in categories, for example: Controls, States and Transitions. Controls include a Java class of elements that manage the active elements of a page such as render control text or interpret user's action with respect to a page. Examples of controls would be the management of a virtual button on a web page or login management that could include providing a number of dialog boxes containing text and a virtual button. States define a user's current location on the website (e.g., in a state machine), such as the web page that a user is presently viewing. States also define the relationship of a user with respect to a web page being viewed. Transitions define the new state of a user and are a function of a users interaction with a page. Specifically, a transition is defined by the user's current state and the actions taken by the user while in that state (e.g., the result of user operation on a control alters the users state). Simply put, the user's new state is simply defined as the user's current state, as modified by the transition selected. The transitions are located in a transition module that is responsible for all transitions.

Advantages of the state machine model of the website are that it is has maintainability to facilitate update flow or pages very easily and per user state machine. service different users with maximum code reuse. It is also consistent in that most or all server logic is handled under the same paradigm. Login control, record and display controls cause transitions which update state. Typically, XML/XSL defines the state machine, page content and layout. It can also be compatible with the Wireless Application Protocol (WAP). This can extend existing web site to provide different state machines for WAP users.

Also included in the web server is a control layer and a module layer, both implemented in the Java programming language. The applications on the application server can be implemented, for example, in the Java programming language.

An Example Architecture

Figure 4:
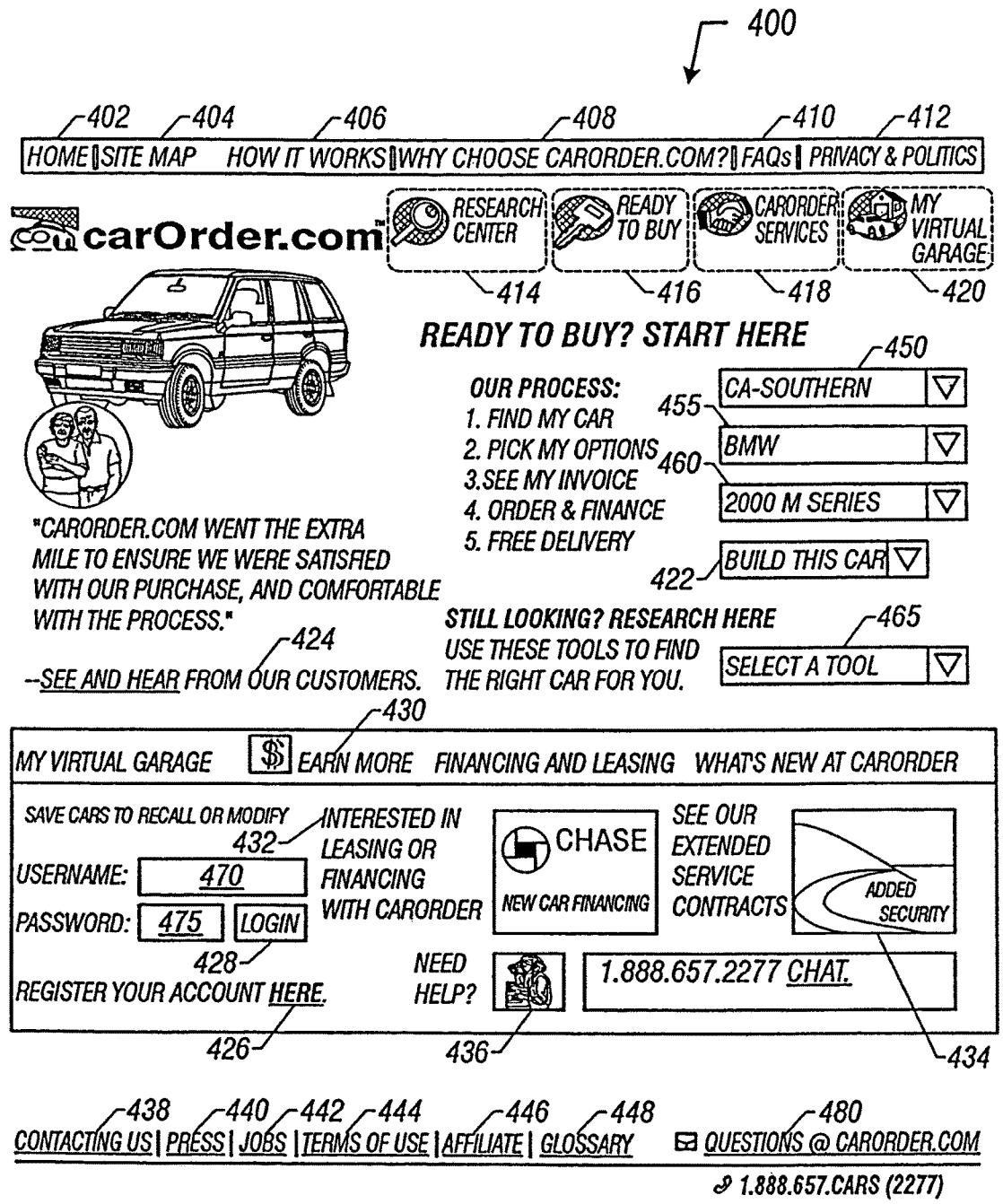
FIG. 4 is a plan view of a web page having a visual representation of a hypertext link and data entry regions employed to access the present invention.

FIG. 4 is an example screen layout illustrating a visual representation of a "web page" 400 presented on display screen 24, for example, at the aforementioned URL address. Web page 400 includes, inter alia, a hypertext link 402. Employing a mouse (e.g.) mouse 46, a cursor 60 can be placed proximate to hypertext link 402, entitled "home" and a cursor event is effectuated (i.e., hypertext link 402 is activated). Activating hypertext link 402 results in a visual representation of web page 400 being present on display screen 24. In this manner, hypertext link 402 connects to web page 400 by having the same rendered on display screen 24. Web page 400 includes a number of hypertext links 402-448, as well as a number of data entry fields 450-475. Also included on web page 400 is a hypertext link 480 for connecting to information promulgated over the Internet via e-mail, for example.

Hypertext links 414, 416, 418 and 434 connect to additional web pages that are in data communication with databases having information concerning products that are the subject of commercial transactions over the data network. For example, in the case of new vehicle sales, hypertext link 414 allows the user to navigate to a page that includes information concerning various models of vehicles. Hypertext link 416 can include information concerning the ordering of a vehicle having a desired set of features. Hypertext link 418 can include information concerning various services provided by carOrder.com. Hypertext link 434 can include information concerning financing of a vehicle to be purchased. Hypertext link 420, on the other hand, allows the user to navigate to a web page displaying information concerning vehicles already selected as being suitable for purchase by the user, as discussed in detail subsequently.

Hypertext links 406-412, 430 and 438-448 are provided to inform users of certain information not germane to a description of embodiments of the present invention. For example, hypertext links 406, 410 and 448 connect to web pages that explain how to use the carOrdercom website. Hypertext links 408, 438, 440 and 442 provide company information concerning carOrder.com, such as summary of the company, services available and benefits thereof, press releases, jobs available, how to contact the company and so on. Hypertext link 412 describes how privacy is maintained on the website. Hypertext link 402 connects to web page 400, and hypertext link 444 discusses the terms and conditions for gaining access to the website. Hypertext link 430 connects to web pages that allow a user to learn more about the carOrder.com website, the process of identifying, selecting and buying a car using the carOrder.com website, and the like. Hypertext link 446 connects to web pages that allow other companies to affiliate themselves (and their websites) with the carOrder.com website.

A user gains access to the various functionalities provided by a website (e.g., web page 400) according to an embodiment of the present invention by placing cursor 60 proximate to hypertext link 428 and effectuating a cursor event, hereinafter referred to as activating or selecting a hypertext link. Before activating hypertext link 428, a user must either enter information corresponding to a preexisting account in data entry fields 470 and 475, or register for a new account by activating hypertext link 426. In this manner, a user can be associated with a storage area that is referred to herein as a Virtual Garage®. To restrict access to the aforementioned storage area, a code that corresponds to the user is associated with the Virtual Garage®. The aforementioned code can include, for example, a user-name and a password. To gain access to the user's Virtual Garage®, the user's user-name is entered in data-entry region 470, with the appropriate password entered in data-entry region 475. As is standard with most password security features, password data is not displayed in field 475.

Figure 5A:
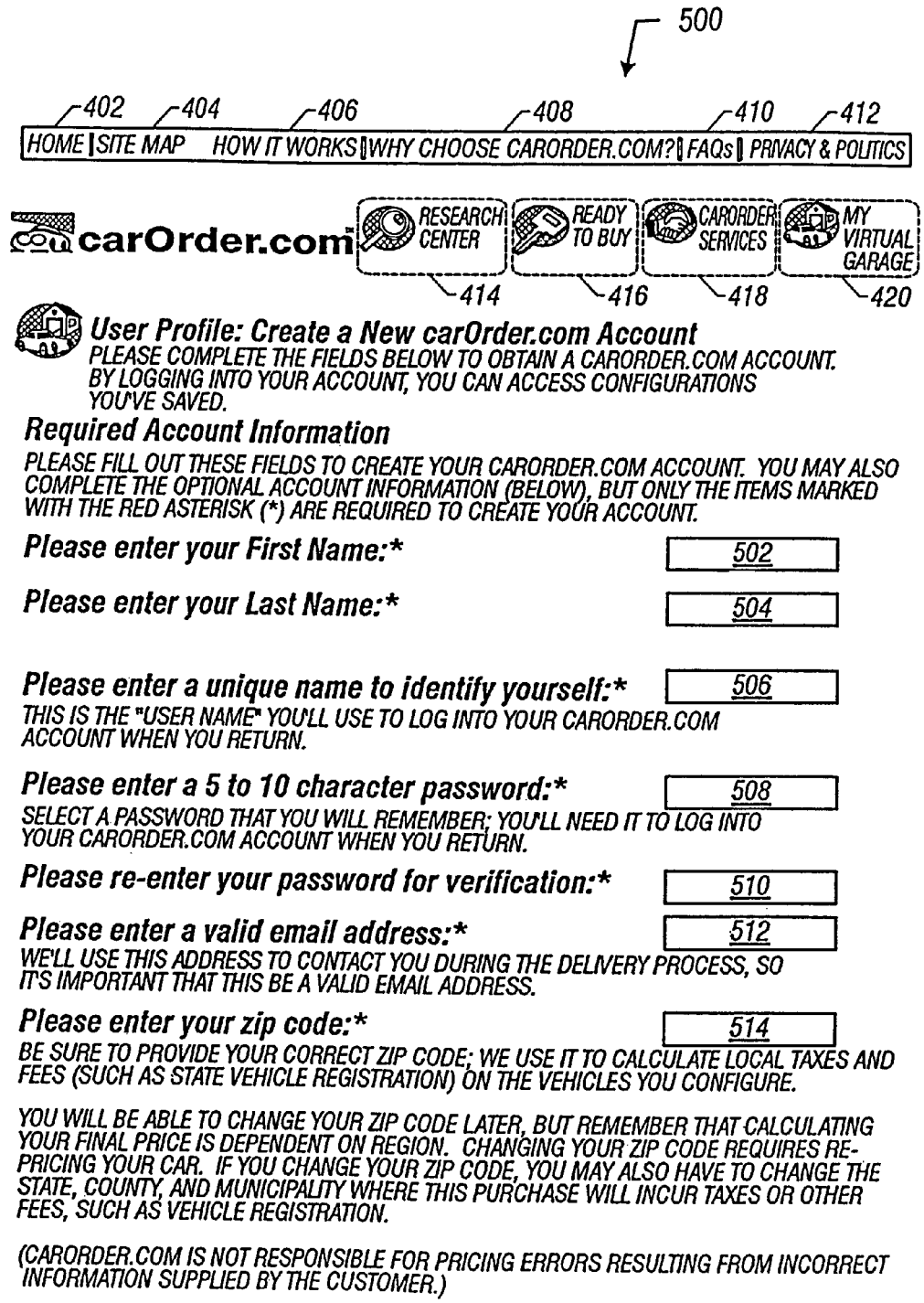

Were a user attempting to gain access to the present invention for the first time, hypertext link 426 would need to be activated to connect to an account registration web page 500, shown in FIGS. 5A and 5B (collectively referred to as FIG. 5). Account registration web page 500 includes a number of data entry fields 502-526 in which the user enters their personal information. Also included on web page 500 are data entry fields, such as data entry fields 530, 532 and 540-558. Data entry fields 530 and 532 indicate the level of restriction on dissemination of the information provided in data fields 502-526. Information in data fields 540-558 indicates how the user became aware of the carOrder.com website. A number of hypertext links not directly related to registration of a user are also included on web page 500. For example, hypertext links 402-420 and 438-448 are the same as shown on web page 500, discussed above.

Upon acceptance of the registration data into the data entry fields 502-526, the user's Virtual Garage® can be accessed by activating hypertext link 420. Activation of hypertext link 420 connects to web page 600, shown in FIG. 6, that includes information concerning products that the user is interested in purchasing. To that end, web page 600 facilitates comparison price shopping by allowing a user to store product-related information concerning multiple products and examine such information. Information concerning various products (in this example) vehicles, can be obtained by activating hypertext link 414, for example. Activating hypertext link 414 connects to web page 700, shown in FIG. 7A, FIG. 7 includes, inter alia, a number of hypertext links that enable access to a database of information related to products such as vehicles. For example, a hypertext link 710 accesses a database concerning information organized by the make and models of vehicles available. A Hypertext link 720 facilitates comparison of vehicles associated with the aforementioned database with other vehicles associated therewith or with information stored by the user in the Virtual Garage®. A Hypertext link 730 accesses the same database, but facilitates searching based upon the features associated with vehicles in the database. Other information is also available to the user, including views of car interiors (accessed using a hypertext link 740), a glossary of terms related to the given type of product offered (accessed using a hypertext link 742) and the sale of used products (accessed using a hypertext link 744).

Figure 7:
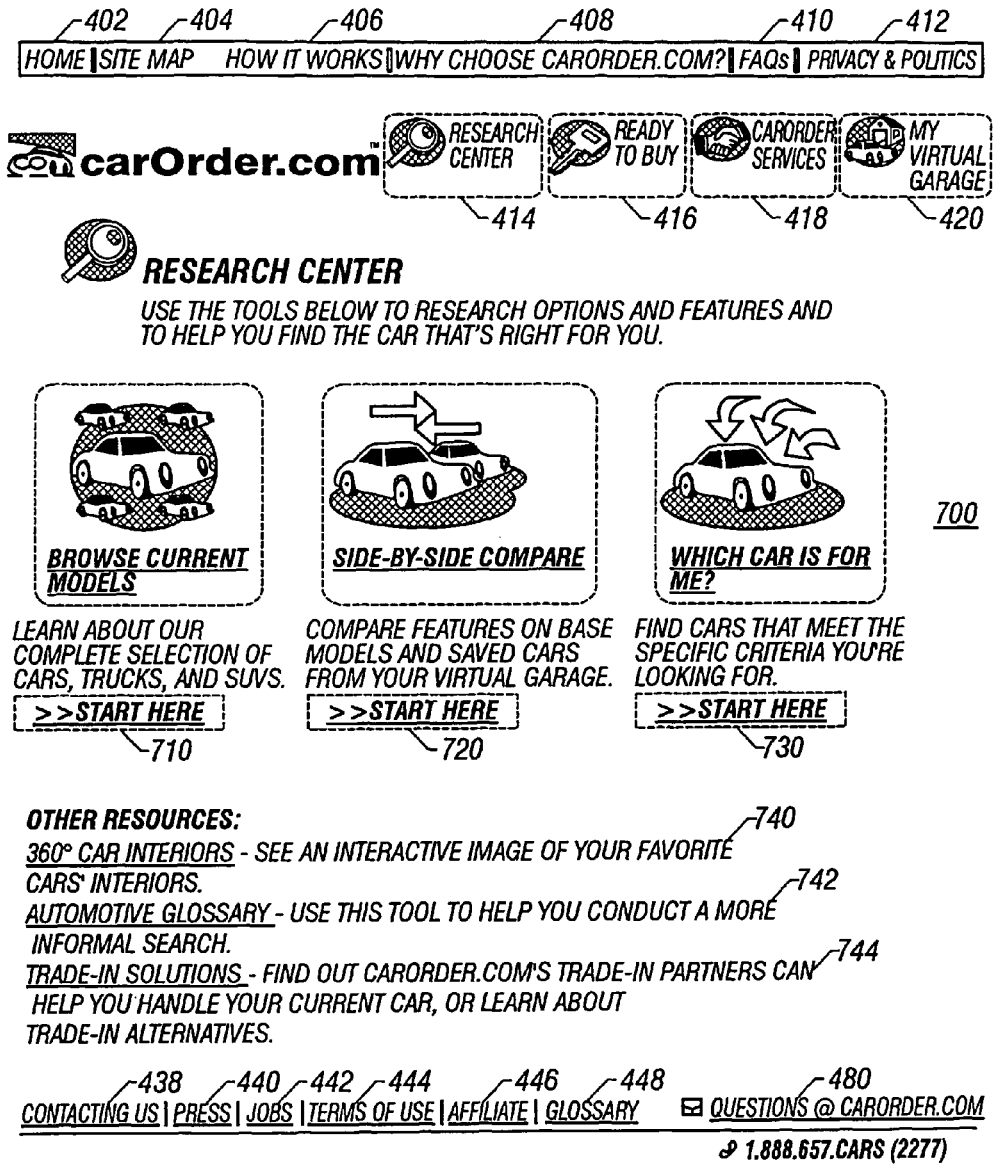
FIG. 7 is a plan view of a web page through which a user can access product-related information according to embodiments of the present invention.
Figure 8A:
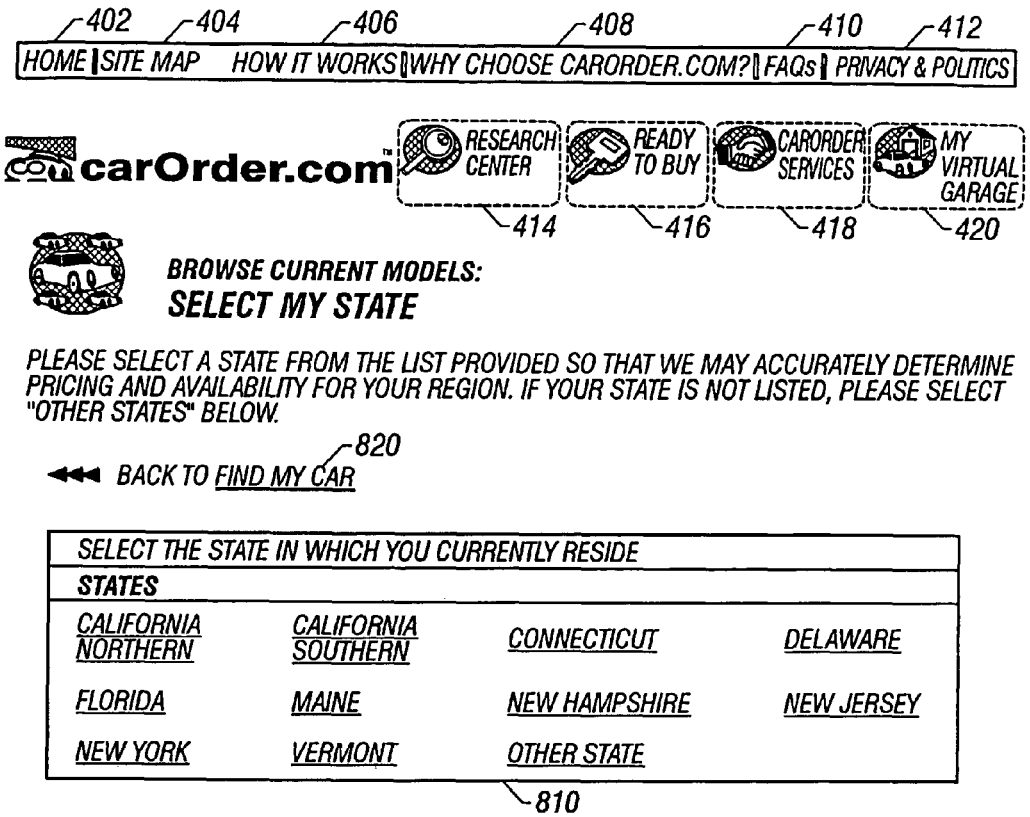
FIG. 8A is a plan view of a web page for entering information regarding a user's location according to embodiments of the present invention.
Figure 8B:
FIG. 8B is a plan view of a web page for entering information regarding a desired manufacturer according to embodiments of the present invention.

FIGS. 7, 8A and 8B are example screen layouts. Activating hypertext link 710 connects to a web page 800. Web page 800 includes a matrix 810 of hypertext links having the names of various states. Identifying the state in which a user will purchase a product allows the price of the given product (e.g., vehicle) to be accurately determined. In addition, a hypertext link 820 is present on web page 800 that connects to web page 700. Activating one of the hypertext links in matrix 810 connects to web pages having a listing of manufacturers.

Figure 9:
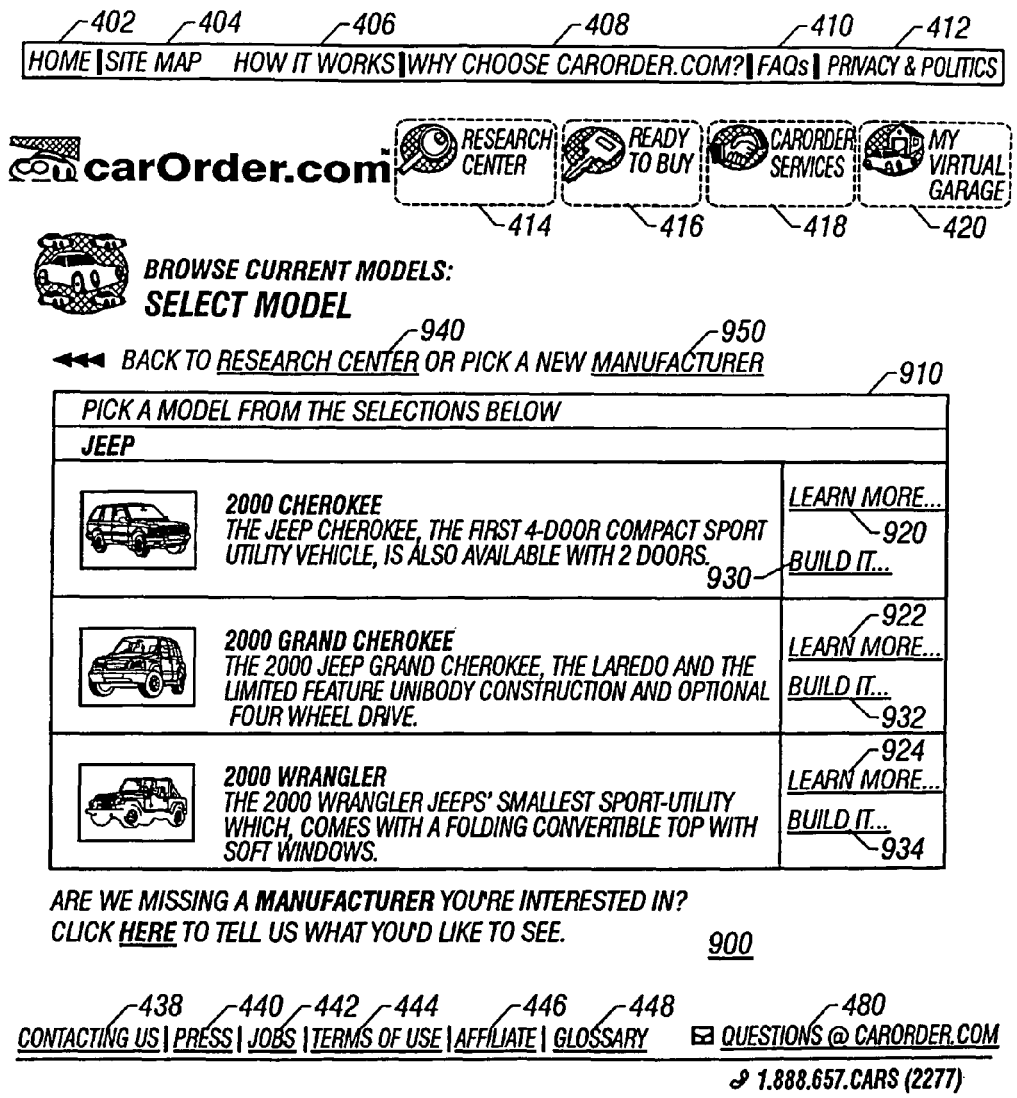
FIG. 9 is a plan view of a web page through which a user can access product-related information for selected products according to embodiments of the present invention.

FIGS. 8B and 9 are example screen layouts illustrating the manufacturers for which products may be selected and the products available from the given manufacturer, respectively. Activating one of the hypertext links in matrix 810 connects to a web page such as web page 850. Web page 850 includes a matrix 860 of hypertext links having manufacturer names associated with various vehicle manufacturers. In addition, a hypertext link 870 is present on web page 850 that connects to web page 700. Activating one of the hypertext links in matrix 860 connects to web pages having a listing of models of cars fabricated by the manufacture whose name is associated with the hypertext link activated. For example, activating the hypertext link entitled "Jeep" connects to a web page 900. Web page 900 includes a brief description of different models of vehicles sold or manufactured under the "Jeep" trademark in a model selection area 910. In addition to the aforementioned descriptions, model selection area includes hypertext links 920, 922 and 924, which allow the user to learn more about the corresponding product. Also included in model selection area 910 are hypertext links 930, 932 and 934, which allow the user to build a custom configuration of the given product according to the user's desires. In addition, web page 900 includes hypertext links 940 and 950. Hypertext link 940 connects to web page 700 to allow a user to research other products. Hypertext link 950 connects to web page 850 to allow a user to view models of vehicles associated with a different manufacturer.

Referring to FIGS. 9, 10, 11 and 12, hypertext links 920, 922 and 924 allow a user to obtain more specific information concerning particular vehicles sold/fabricated by the manufacturer. For example, hypertext link 922 connects to s web page 1000 that recites more detailed information concerning the Grand Cherokee model of Jeep vehicle in text region 1010 entitled "overview." Web page 1000 also includes various hypertext links that facilitate obtaining additional information concerning the Jeep Grand Cherokee.

These hypertext links include a hypertext link 1020 and a hypertext link 1030. Hypertext link 1020 connects to a web page (a web page 1100) containing information regarding performance characteristics of the Jeep Grand Cherokee. Web page 1100 is similar to web page 1000, excepting text region 1110 concerning the performance characteristics of the Jeep Grand Cherokee. Also similar are the presence of hypertext links 1120 and 1130, which connect to web page 1000 and a web page 1200, respectively. Hypertext link 1120 connects to web page 1000, returning the user to the overview of the Jeep Grand Cherokee. Hypertext link 1130 connects to web page 1200 containing information regarding the various features available on the Jeep Grand Cherokee.

Web page 1200 is similar to web page 1000, excepting recitations concerning the features available on the Jeep Grand Cherokee. Also, unlike web pages 1000 and 1100, web page 1200 includes hypertext links 1220 and 1230 that allow connections to web pages 1000 and 1100, respectively. Hypertext link 1220, as with hypertext link 1120, connects to web page 1000, returning the user to the overview of the Jeep Grand Cherokee. Hypertext link 1230, as with hypertext link 1030, connects to web page 1100, returning the user to the performance characteristics of the Jeep Grand Cherokee.

Web page 1000 also includes a hypertext link 1040 that allows a user to connect to web page 850 to choose information concerning vehicles associated with a different manufacturer. A Hypertext link 1050 allows a user to connect to web page 900 to obtain information related to a different model of the same manufacturer. Activating a hypertext link 1060 allows a user to choose different groups of features for the present model of vehicle that are provided by the manufacturer, referred to as option packages. In this manner, a user is able to "build" a vehicle model having the desired features.

Figure 13:
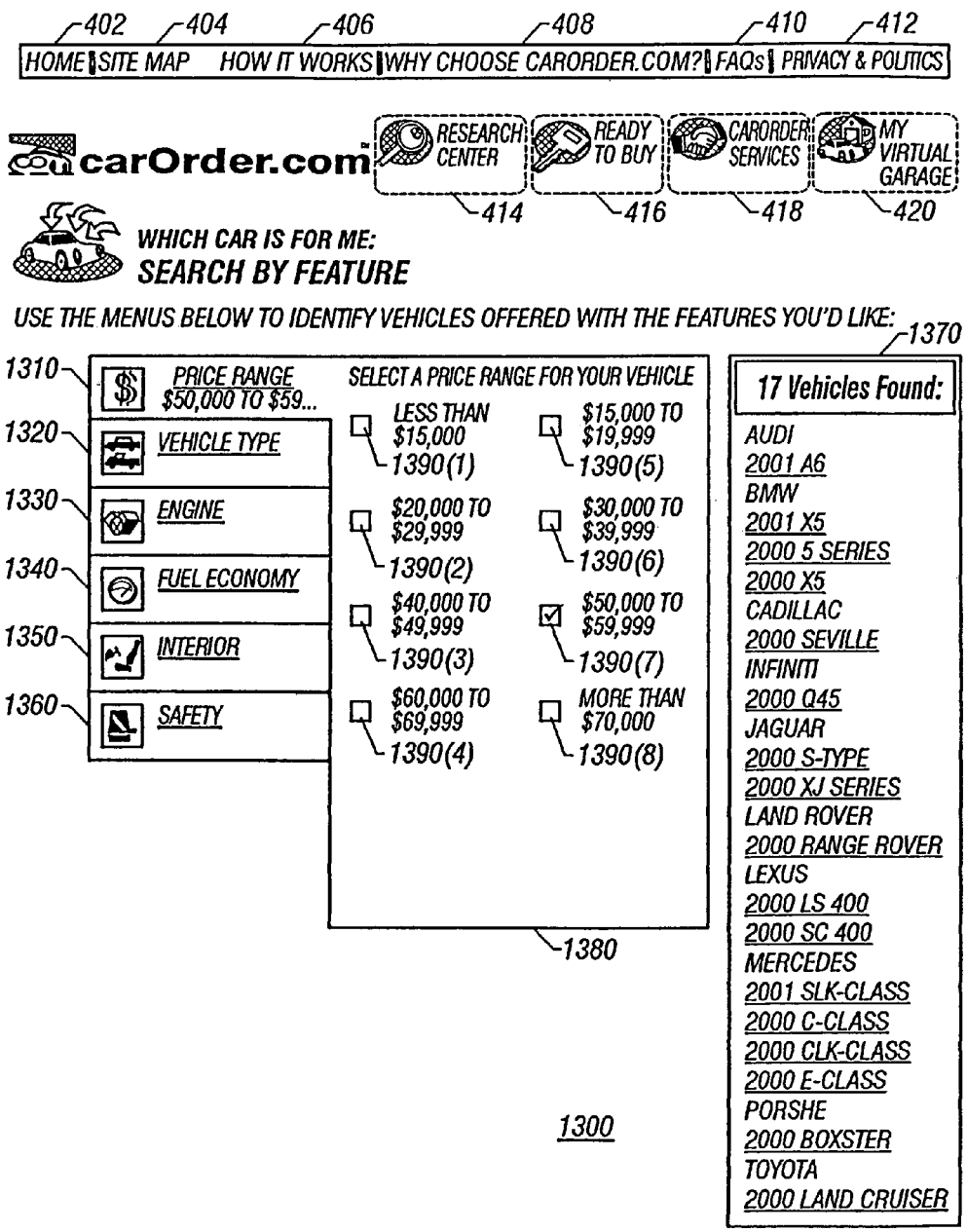
FIG. 13 is a plan view of a web page that allows a user to identify a desired product by price range according to embodiments of the present invention.
Figure 14:
FIG. 14 is a plan view of a web page that allows a user to identify a desired product by vehicle type according to embodiments of the present invention.

Referring to FIGS. 7, 13 and 14, from web page 700, a user can search for a particular vehicle based upon features desired. To that end, hypertext link 730 can be activated, connecting to a web page 1300. Web page 1300 includes a number of hypertext links 1310-1360, which connect to various other web pages containing information concerning various features available on a list of vehicles recited in a column 1370. Web page 1300 also includes a data entry region 1380 having a number of data entry fields 1390(1)-(8). As depicted in FIG. 13, each of data entry fields 1390(1)-(8) corresponds to a range of values. One or more of data entry fields 1390(1)-(8) can be selected to indicate the price of a vehicle in which a user is interested. Activating hypertext link 1320 connects to a web page 1400. Web page 1400 is similar to web page 1300, excepting a data entry region 1410. A data entry region 1410 includes a number of data entry fields that correspond to characteristics of a vehicle, such as different options regarding body styles, drive trains and engine locations.

Figure 15:
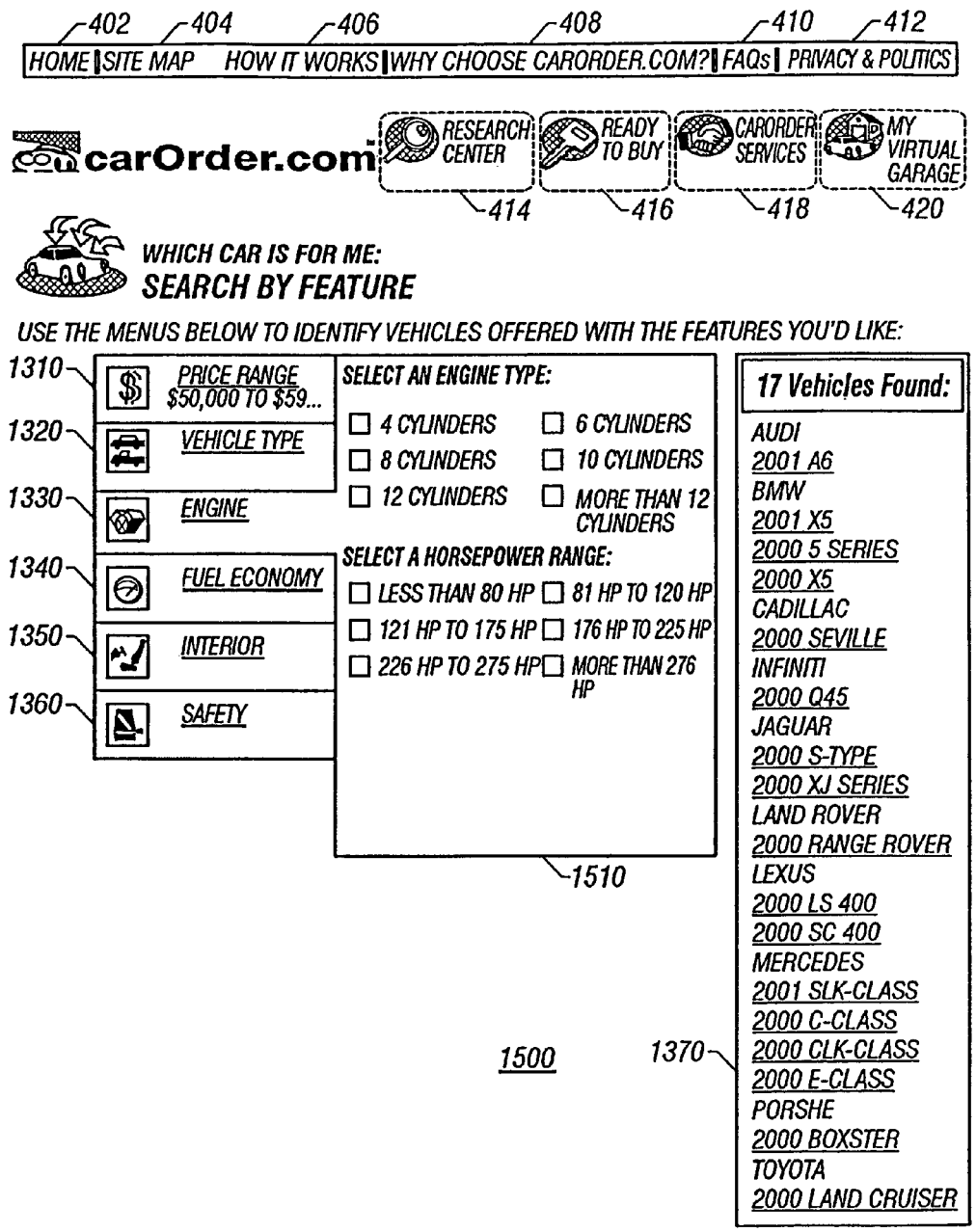
FIG. 15 is a plan view of a web page that allows a user to identify a desired product by engine characteristics according to embodiments of the present invention.

Referring to FIGS. 13 and 15, activating hypertext link 1330 connects to a web page 1500. Web page 1500 is similar to web page 1300, excepting the addition of a data entry region 1510. Data entry region 1510 includes a number of data entry fields that correspond to the characteristics of the engine associated with the desired vehicle. The aforementioned characteristics include the horsepower and the number of cylinders in the given engine.

Figure 16:
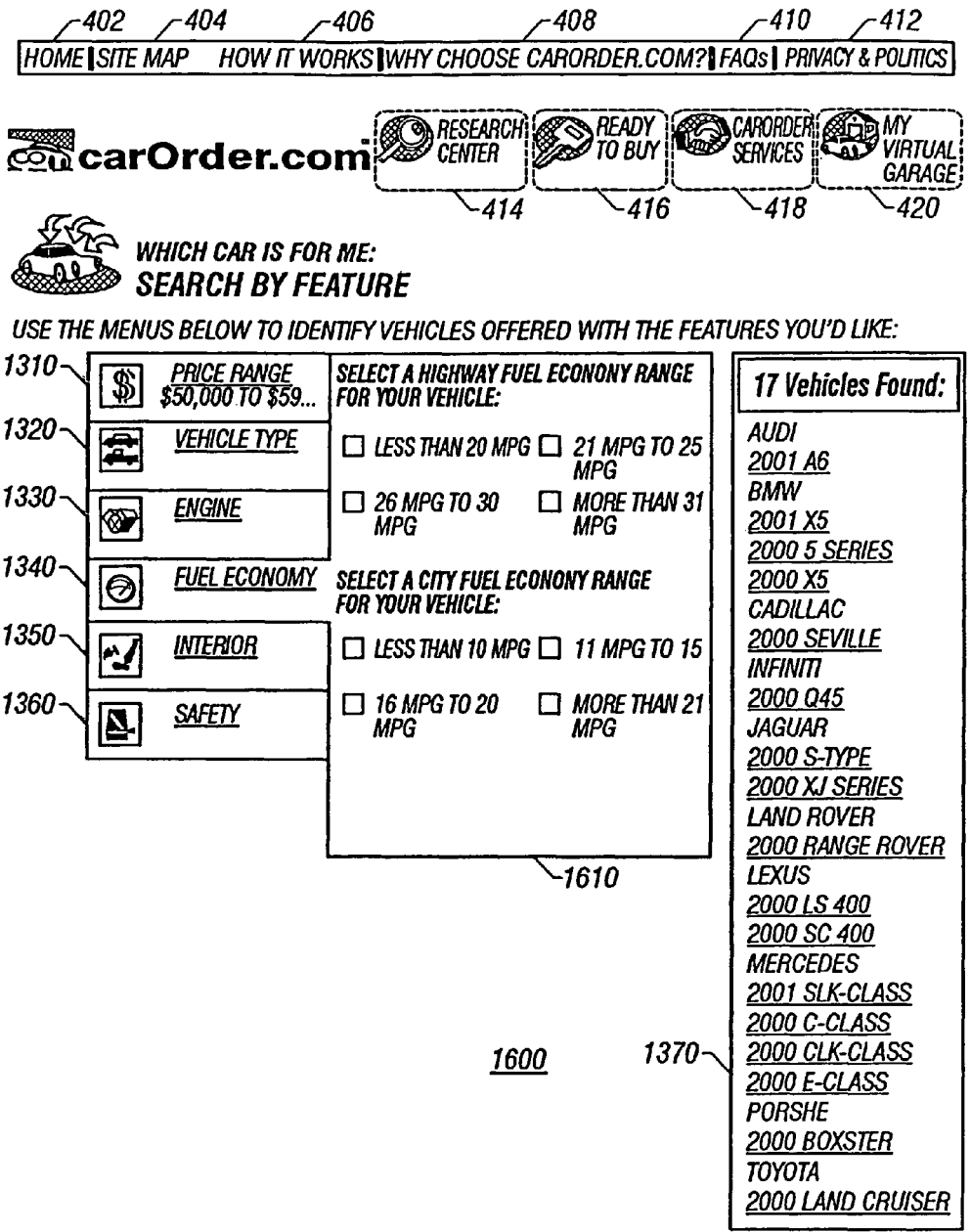
FIG. 16 is a plan view of a web page that allows a user to identify a desired product by fuel economy according to embodiments of the present invention.

Referring to FIGS. 13 and 16, activating hypertext link 1340 connects to a web page 1600. Web page 1600 is similar to web page 1300, excepting the addition of a data entry region 1610 that includes a number of data entry fields that correspond to fuel economy of a vehicle. As a result, a user can select a vehicle based upon the fuel economy desired of the vehicle.

Figure 17:
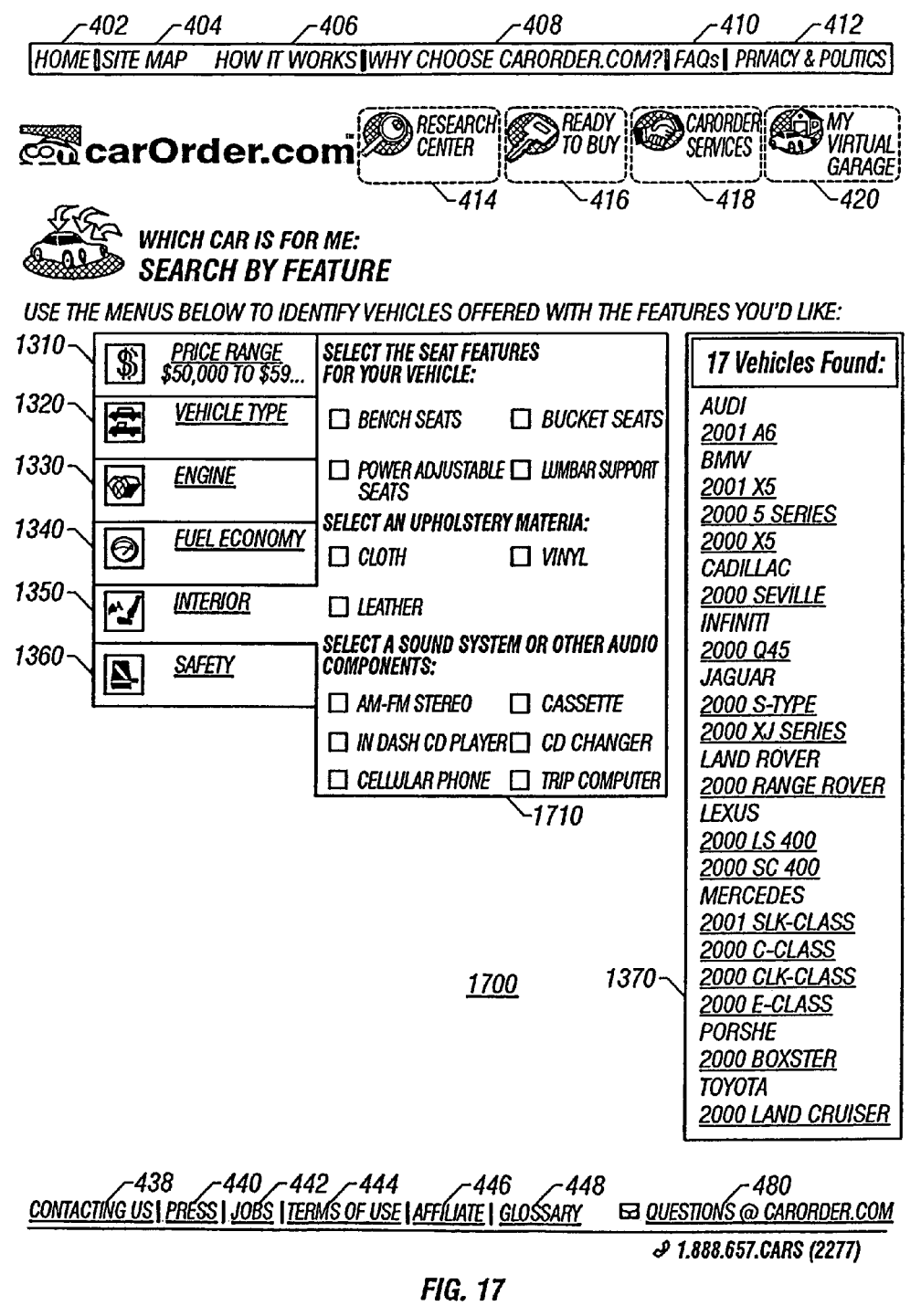

Referring to FIGS. 13 and 17, activating hypertext link 1350 connects to web page 1700. Web 1700 is similar to web page 1300, excepting the addition of a data entry region 1710 which includes a number of data entry fields that correspond to the characteristics a vehicle's interior. The aforementioned characteristics can include the type of seats included with the vehicle, e.g., bench or bucket seats, as well as the upholstery thereof. Additionally, the type of sound system can be chosen from data entry regions in data entry region 1710.

Figure 18:
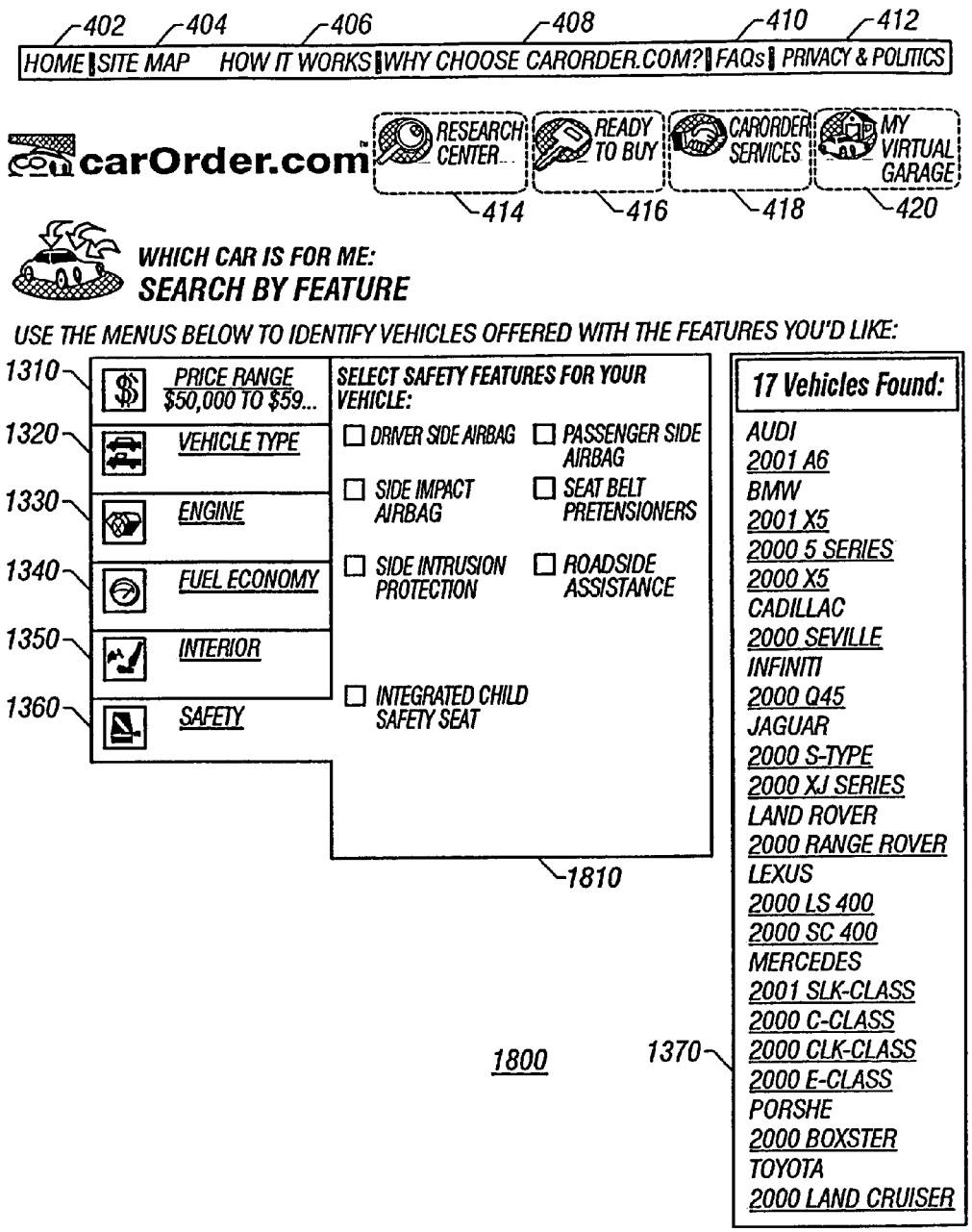
FIG. 18 is a plan view of a web page that allows a user to identify a desired product by safety features according to embodiments of the present invention.

Referring to FIGS. 13 and 18, activating hypertext link 1360 connects to a web page 1800. Web page 1800 is similar to web page 1300, excepting the addition of a data entry region 1310 which includes a number of data entry fields that correspond to the safety characteristics a vehicle. This allows selecting vehicles based upon the safety restraint systems associated therewith, e.g., driver side airbag, integrated child safety seat, roadside assistance and the like. The aforementioned characteristics can include the type of seats included with the selected vehicle, (e.g., bench or bucket seats), upholstery and the like. Additionally, the type of sound system can be selected using data entry regions in data entry region 1310.

Referring to FIGS. 7 and 19, from web page 700 a user can also select vehicles based upon side-by-side comparisons. To that end, activation of hypertext link 720 connects to a web page 1900. Web page 1900 has a number of drop-down menus 1905-1930 and data entry regions 1935-1980. A subset of drop-down menus 1905-1930 (i.e., drop-down menus 1905-1930) and a subset of data entry regions

1935-1980 (i.e., data entry regions 1935-1955), are associated with product information concerning a vehicle. The remaining drop-down menus, (drop-down menus 1920-1930), and the remaining data entry regions, (data entry regions 1960-1980), are associated with product information concerning a second vehicle. It will be noted that drop-down menus 1905-1930 include virtual buttons 1990-1995.

To compare product-related information regarding two vehicles, the appropriate data entry regions (data entry regions 1935 and 1940) are selected. For example, if a comparison of information stored in the Virtual Garage® is desired, a user selects data entry region 1940. For the present discussion, it is assumed that data entry region 1935 is selected. For example, drop-down menu 1905 is entitled "select make" and includes a virtual button 1990. Activating virtual button 1990 expands drop-down menu 1905. This enables a user to scroll through a list of vehicle manufacturers and select a particular manufacturer for the first vehicle by selecting the same. The remaining drop-down menus (drop-down menus 1910 and 1915, having virtual buttons 1991 and 1992), entitled "select model" and "select trim," respectively, operate in a manner similar to drop-down menu 1905 (i.e., using virtual buttons 1991 and 1992), respectively. This enables a user to select the first vehicle based upon the manufacturer, model and trim. The second vehicle is selected in a similar fashion using drop-down menus 1920-1930 and data entry regions 1960-1980.

Referring to FIGS. 7 and 20, a comparison between product-related information concerning the second vehicle and product-related information stored in the user's Virtual Garage® desired, data entry region 1940 in FIG. 19 is selected, connecting to a web page 2000. Web page 2000 is similar to web page 1900, excepting for the absence of drop-down menus 1905-1915. In place of drop-down menus 1905-1915, drop-down menu 2010 entitled "select garage car" is provided. Activating virtual button 2020 (associated with drop-down menu 2010) expands drop-down menu 2010 to enable a user to scroll through a list of vehicles for which information is stored in the user's Virtual Garage®.

Figure 22A:
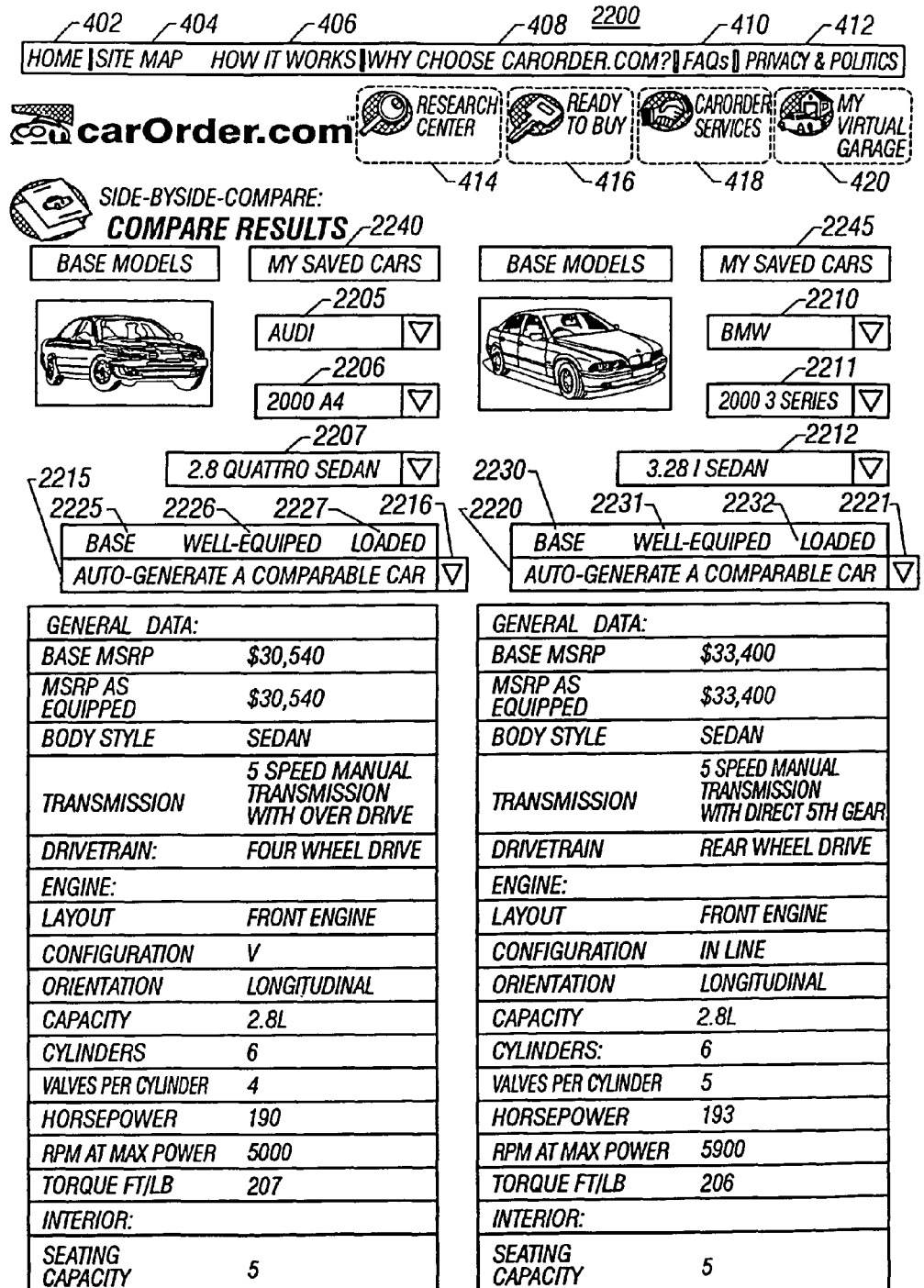
FIG. 22 is a plan view of a web page that allows a user to compare products according to embodiments of the present invention.

Referring to FIGS. 19, 21 and 22, after selection of the make, model and trim of the two vehicles on web page 1900, web page 1900 appears, for example, as depicted in FIG. 21 as a web page 2100. Web page 2100 is similar to web page 1900 except for the inclusion of hypertext link 2110 entitled "compare." Activation of hypertext link 2110 connects to a web page 2200. In addition to including product-related information, web page 2200 includes six drop-down menus 2205-2212 that correspond to drop-down menus 1905-1930 of FIG. 19, as well as six data entry regions 2225-2232 that correspond to data entry regions 1945-1955 and 1970-1980 of FIG. 19. Two additional drop-down menus are included on web page 2200 (drop-down menus 2215 and 2220) that are each entitled "auto-generate a comparable car", as well as two hypertext links 2240 and 2245. The product-related information is arranged in two columns (columns 2250 and 2255), with product-related information concerning the first vehicle being displayed in column 2250, and product-related information concerning the second vehicle displayed in column 2255. The information is arranged so that analogous, or common, characteristics of the two vehicles are recited in a common row. For example, information concerning the transmission of the first vehicle in column 2250 is directly across from the transmission information concerning the second vehicle recited in column 2255. In this manner, a user can quickly and easily compare the characteristics of two vehicles. It will be noted that this approach can easily be extended to the comparison of three or more vehicles.

If a user desires to vary the product-related information being compared, the user can change the information in either column 2250 and 2255. To that end, the user can use drop-down menus 2205-2207 and 2210-2221 to select a different manufacturer and/or model, as well a trim, as discussed above with respect to web page 1900. Alternatively, hypertext links 2240 and/or 2245 can be activated to obtain product-related information stored in the Virtual Garage®. Finally, drop-down menu 2215 can be used to have information concerning a vehicle, is comparable to the information concerning the vehicle recited in column 2250 automatically generated. To that end, a user selects virtual button 2216 to select a variable by which to seek a comparable vehicle. The variables can consist of characteristics such as price or features. In a similar fashion, the product-related information in column 2255 can be varied employing drop-down menu 2221.

Referring to FIGS. 22, 23 and 24, hypertext links 2260 and 2265 can be selected to save the product-related information in column 2250 and column 2255, respectively. For example, activating hypertext link 2260 connects to web page 2300 that includes hypertext link 2310. Activation of hypertext link 2310 saves the product-related information concerning the first vehicle, displayed in column 2250, in the user's Virtual Garage®. From web page 2300, a user can also vary the product-related information concerning the first vehicle that can be saved to the user's Virtual Garage®. To that end, a number of data entry regions (e.g., data entry regions 2320(1)-(14)) corresponding to one or more of the product's characteristic's (e.g., various exterior and interior colors) are provided. Additionally, by selecting hypertext link 2330, the information concerning the first vehicle can be varied by selecting differing option packages associated with the present model. Selecting hypertext link 2330 connects to web page 2400 which includes a number of data entry regions 2410(1)-(N) that allow selection of different options provided by the manufacturer. From web page 2400, the information concerning the first vehicle can be saved to the user's Virtual Garage® by activation of hypertext link 2420. Finally, activation of link 2430 allows the user to obtaining an updated price of the vehicle.

Figure 25:
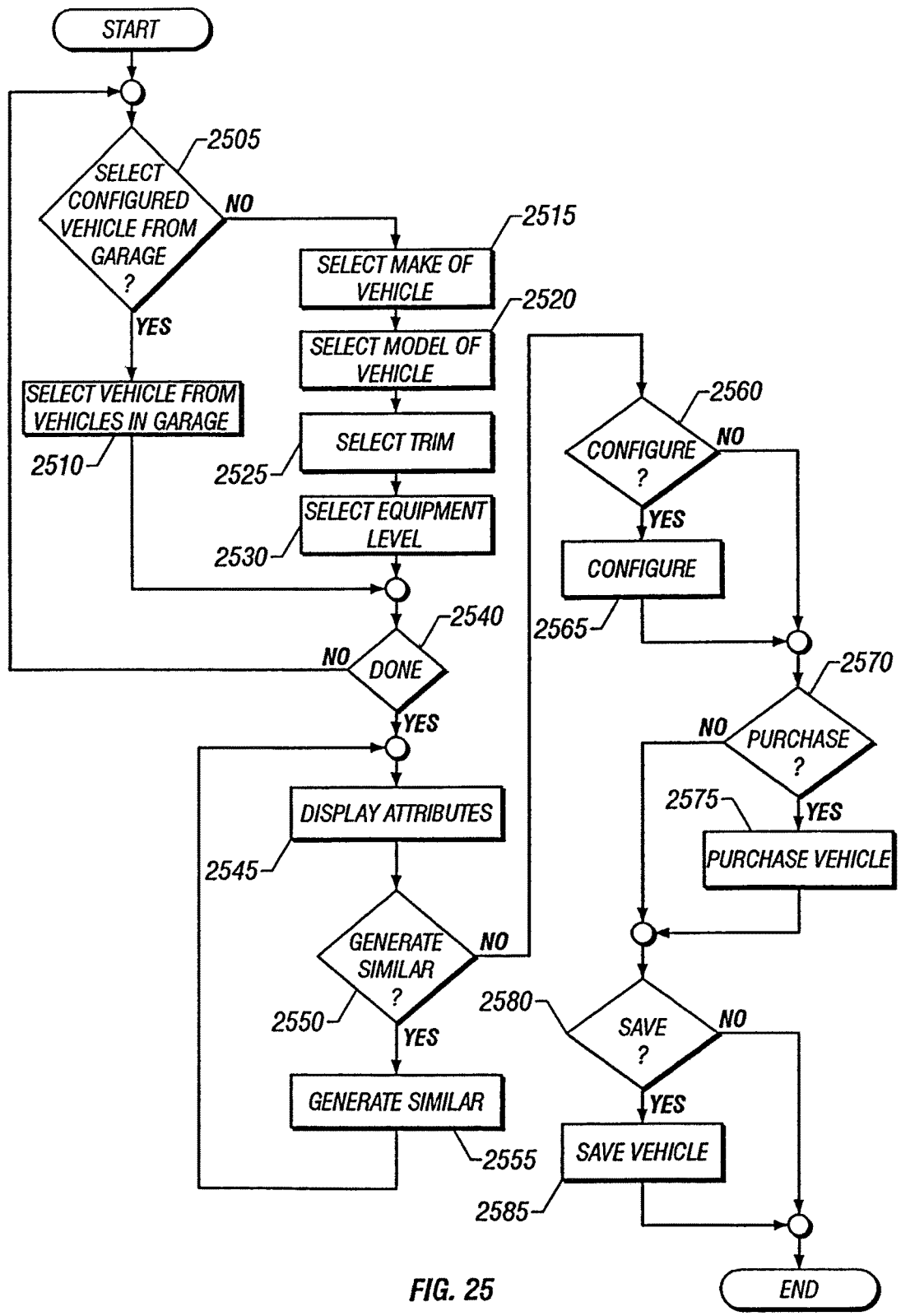
FIG. 25 is a flow diagram illustrating a comparison process according to embodiments of the present invention in which the features of two or more cars are compared.

FIG. 25 is a flow diagram illustrating a comparison process 2500, in which the features of two or more cars are compared. The process begins with a determination as to whether the user desires to select a previously-configured car from that user's Virtual Garage® (step 2505). This selection appears in web page 1900 as data entry regions 1935 and 1940. By selecting one of data entry regions 1935 and 1940, the user is able to identify whether a car saved in the user's Virtual Garage® should be used, or would prefer to use drop-down menus 1905-1930 in conjunction with data entry regions 1945-1955 to configure a car for comparison, for example. If the user wishes to use a car stored in that user's Virtual Garage®, the user selects the desired car from that user's Virtual Garage® (step 2510). This action corresponds to data entry region 1940 being the subject of a cursor event, as noted previously.

Alternatively, the user may desire to configure a car using drop-down menus 1905-1915 and data entry regions 1945-1955, for example. In that case, the user indicates their preference by selecting data entry region 1935 (step 2515). If such an election is made, the user employs drop-down menu 1905 to select the make of car desired (step 2515). In similar fashion, the user employs drop-down menu 1910 to select the model of car desired (step 2520), and drop-down menu 1915 to select the model trim desired (step 2525). Once the car's make, model and trim have been selected, the user then selects how the vehicle is to be equipped, by selecting the vehicle's equipment level (step 2530). To select an equipment level, the user employs functionality such as data entry regions 1945-1955 to provide such information (step 2535). After selecting the equipment level, the user can repeat the process for another vehicle to be compared (step 2540). It will be apparent to one of skill in the art that, while FIGS. 19-22 are depicted in terms of a comparison of two vehicles, the techniques described herein are equally applicable to the comparison of three of more products. It will also be noted that, if the user is not satisfied with the attributes of a given vehicle (step 2550), the user is able to return to the beginning of the process (or, alternatively, to a selected point in the process) to reconfigure the vehicle as desired.

Once the vehicles to be compared are identified and configured to the user's satisfaction, the vehicles' attributes are displayed (step 2545). Once the vehicles' attributes are displayed, the user is given the option to generate a vehicle, comparable to that being configured (e.g., but from a different manufacturer or product line), for comparison (steps 2550 and 2555). This can include generating a vehicle that is comparable with regard to vehicle type (e.g., the vehicle for which a configuration is generated is also a car, a truck, an SUV, a sports car or other vehicle type), price, equipment options and so on. This allows the user to quickly and easily compare a given vehicle's displayed attributes to those of one or more comparable vehicles. It will be noted that an architecture such as that described herein allows such vehicle configurations to be generated based on general criteria, such as an equipment level (e.g., "base", "well-equipped" or "loaded"). This is possible because certain corresponding configurations are defined for at least some of the vehicles offered, in order to support the ability to generate configurations using such general criteria. It will also be noted that an architecture such as that described herein also allows the configuration information thus generated to be persisted to other functions within the architecture (e.g., a configuration engine that allows the user to vary certain equipment features of the given vehicle, in the process of configuring a vehicle for evaluation, storage (e.g., in the user's Virtual Garage®)), purchase and the like), as is now described.

Once the user is satisfied that one of the displayed vehicles is acceptable, the user can elect to configure the given vehicle by selecting the appropriate one of hypertext link 2260 or hypertext link 2265, for example (steps 2560 and 2565). Thus, the user accesses web pages 2300 and 2400 to configure the vehicle to their satisfaction. Once the vehicle is configured to the user's satisfaction (or if the vehicle is already thus configured), the user may elect to purchase the vehicle (steps 2570 and 2575) and/or may also elect to save the (configured) vehicle in that user's Virtual Garage®. It will be noted that, once configured (either via the standard configuration described through the comparison process or searching by features), the vehicle configuration can be passed to a configuration engine that is accessed via an interface such as web pages 2300 and 2400, and described below in connection with FIG. 29. It will also be noted that such a configuration can be stored in the user's Virtual Garage®. These actions can be taken without further input from the user, as a result of the information's being persisted from one function to another.

As noted, FIG. 25 depicts a flow diagram illustrating a selection process according to one embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of FIG. 25 may be executed by a module (e.g., a software module) or a portion of a module or a computer system user using, for example, a computer system such as the storage router previously mentioned, or a similar network element, as well as a computer system such as computer system 210. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, etc. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 26:
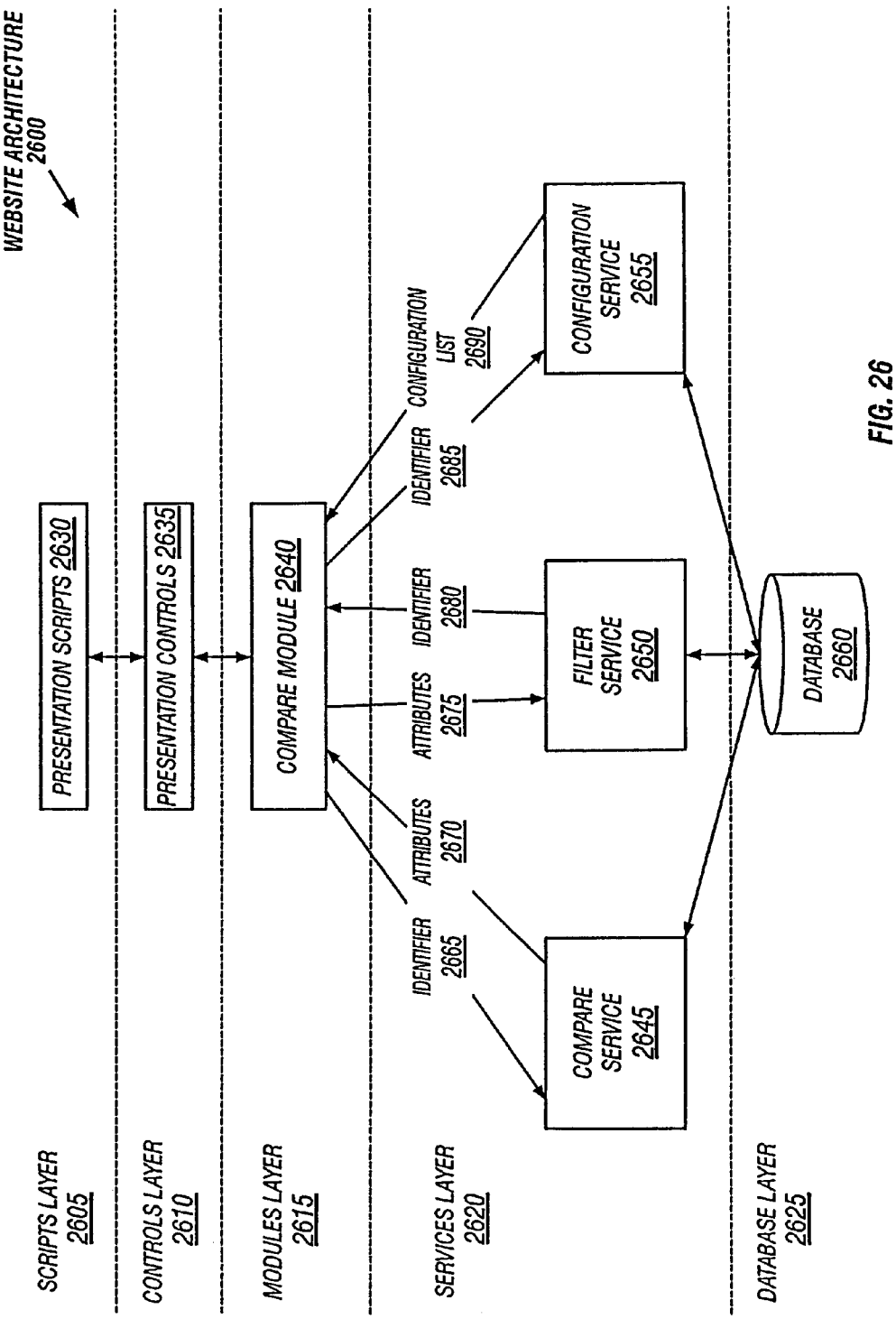
FIG. 26 is a block diagram illustrating a software architecture according to embodiments of the present invention.

FIG. 26 is a block diagram illustrating a software architecture (specifically, a website architecture 2600) including the various layers and modules that can be used to create a website such as that depicted in FIGS. 3-24 herein. Website architecture 2600 includes a scripts layer 2605, a controls layer 2610, a modules layer 2615, a services layer 2620 and a database layer 2625. Scripts layer 2605 includes a set of presentation scripts 2630, which may be implemented using a scripting language, for example. Similarly, controls layer 2610 includes a set of presentation controls 2635. Presentation controls 2635 provide functionality that interoperates with presentation scripts 2630 to provide the user interface presented to a user accessing a website supported by a website architecture such as website architecture 2600. The functionality provided by presentation controls 2635 includes management of HTML controls, lists, links and buttons that provide the functionality presented by such a website.

Typically, controls have no state, except that which is needed for the actual control itself (e.g., identity). Modules layer 2615 includes a compare module 2640, among other modules. In general, modules are used for tasks such as caching, cross-module communication and management of communications with the various services to which the given module belongs, which includes the management of object caching and the servicing of objects. As its name implies, compare module 2640 provides the functionality necessary to allow a user to compare the attributes of one vehicle with those of another and so to support the functionality presented as web pages 1900, 2000, 2100 and 2200. Services layer 2620 includes a compare service 2645, a filter service 2650 and a configuration service 2655. Services layer 2620 acts as an interface between modules layer 2615 and database layer 2625, and provides functionality such as data persistence and data preparation, allowing interaction with other functions within the architecture, such as remote resources. It will be noted that this persistence allows the configuration information thus generated to be made available to other functions within the architecture without further user intervention (e.g., without requiring a user to re-enter the configuration information thus generated). A services layer such as services layer 2620 also allows for the persistence of the respective information for each of the separate functionalities represented by each service therein, as well as control and management of the given service's data. Typically, a service has no state associated therewith.

Thus, as a result of this persistence, a user can easily store (and retrieve) product-related information. Once a user has configured a product (or has identified a product configuration) that the user wishes to store, the user can simply store the configured product (or product configuration) without having to re-enter configuration information because the configuration data is still available (has been persisted) in services layer 2620. This simplifies the user's interaction with the system (and so the purchasing process), improving the user's shopping experience and increasing the likelihood that the user will purchase the given product(s), as previously noted.

In supporting the functionality provided by compare module 2640, compare service 2645, filter service 2650 and configuration service 2655 respond to requests for information from compare module 2640 based on information provided by compare module 2640. Such information is provided from the one or more databases of database layer 2625 (exemplified by a database 2660, which is also referred to herein as a product information database). Database layer 2625 (via database 2660) effects the actual storage of the data employed by the various functions provided by website architecture 2600. In providing such support, database 2660 provides compare service 2645, filter service 2650 and configuration service 2655 with the data necessary for these services to respond to requests from compare module 2640. For example, compare module 2640 can provide compare service 2645 with an identifier 2665. Compare service 2645 then queries database 2660 using identifier 2665, in order to identify a set of attributes 2670 which are then passed from compare service 2645 to compare module 2640, in response to the request from compare module 2640. This might be the case where, for example, a user wished to compare a first vehicle with a second vehicle. It will be noted that this and other requests discussed herein are in response to user actions presented via scripts layer 2605 (e.g., presentation scripts 2630) and controls layer 2610 (e.g., presentation controls 2635).

In similar fashion, compare module 2640 can provide a set of attributes 2675 to filter service 2650 in order to allow a search of database 2660 based on the attributes provided (i.e., attributes 2675). Assuming one or more vehicle configurations match attributes 2675, the identifiers for such vehicle configurations (exemplified by identifiers 2680) are passed from filter service 2650 to compare module 2640, having been gleaned from database 2660 by the filtering operation (i.e., search). This might be the case where, for example, a user wished to identify vehicles meeting that user's stated criteria.

Alternatively, compare module 2640 can supply an identifier 2685 to configuration service 2655 in order to identify a list of configurations for the given identifier. This might be the case, for example, where a user desired to see a list of possible configurations or equipment options available for a given vehicle. Once configuration service 2655 has received identifier 2685, configuration service 2655 accesses database 2660 to identify those parts (e.g., vehicle configurations) having an identifier matching identifier 2685. Once the search of database 2660 is complete, configuration service 2655 supplies a configuration list 2690 to compare module 2640, for subsequent presentation to the user via scripts layer 2605 and controls layer 2610. Configuration service 2655 can be used, for example, when generating a comparable vehicle or when generating a vehicle for comparison based on general criteria (e.g., make, model, trim and equipment level).

Figure 27:
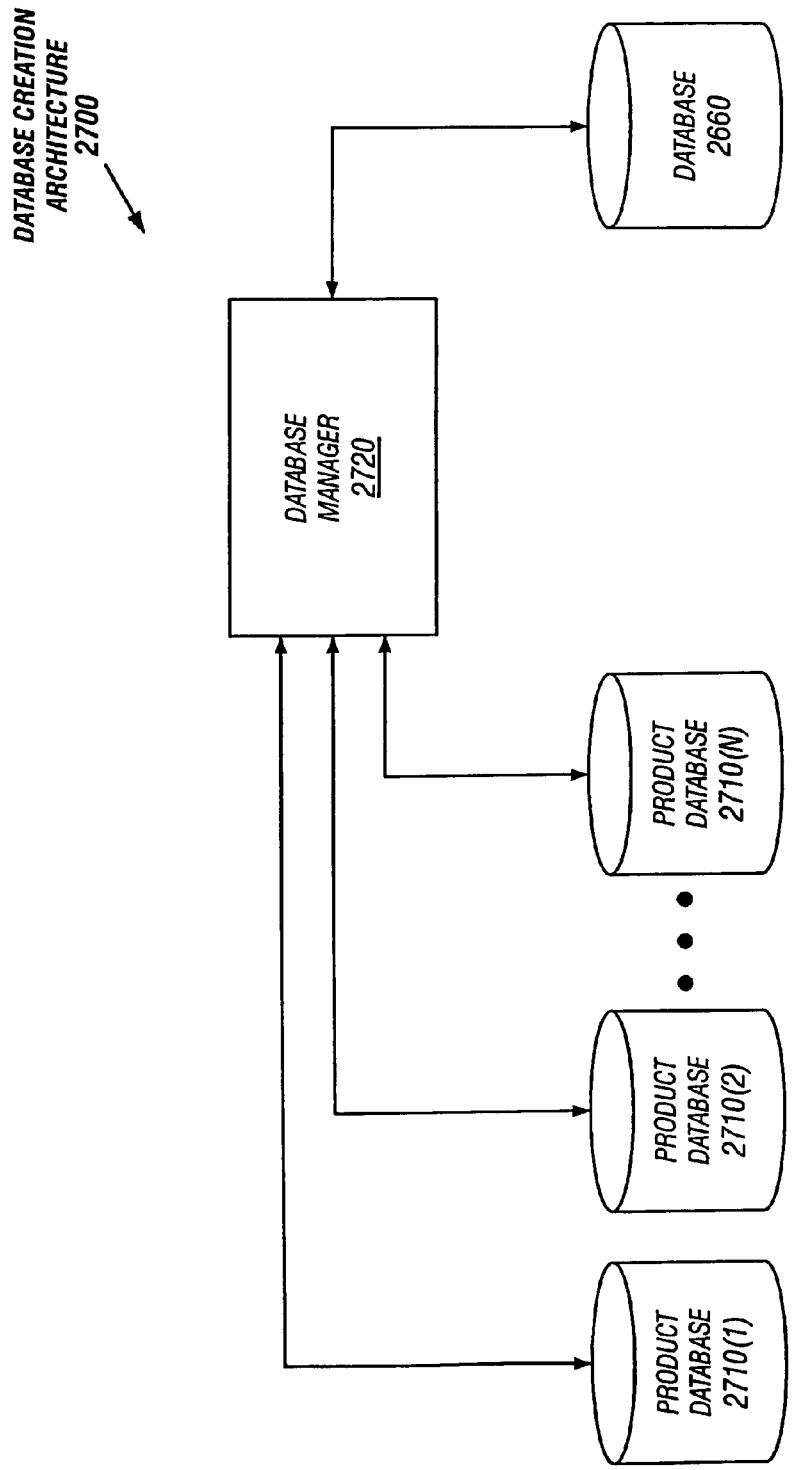
FIG. 27 is a block diagram illustrating the creation of a database according to embodiments of the present invention.

FIG. 27 is a block diagram illustrating the creation of a database such as database 2660 (referred to herein as a database creation architecture 2700). This is, in effect, a pre-processing step in which a (potentially large) number of possible configurations are enumerated for inclusion in database 2660. In the case of vehicles, as with many commercially-available products, a relatively large number of permutations can exist when considering various features that may be available for such products. With a large number of features, and so possible combinations, the problem of quickly presenting a given configuration becomes one of a combinatorial nature. To avoid (or at least lessen) such effects, embodiments of the present invention employ a pre-processing operation in creating database 2660. Thus, for each product (e.g., vehicle) included in database 2660, a separate database is used. Such databases are exemplified in FIG. 27 by product databases 2710(1)-(N). Product databases 2710(1)-(N) include information regarding the features of each such product. For example, each one of product databases 2710(1)-(N) can include information regarding the available equipment options for a given make and model of a vehicle.

Rules governing allowable combinations of such features can also be included in product, databases 2710(1)-(N). For example, in the context of vehicle equipment configurations, certain combinations of attributes are either not possible or not allowable. This might be the case, for example, where two equipment options where either mutually exclusive (e.g., cloth upholstery and leather upholstery) or where the manufacturer does not permit such combinations (e.g., a sun-roof in a base model). Such rules can also enumerate the precedence with which product features are satisfied when generating a comparable product (e.g., vehicle type, price, engine characteristics, trim features and so on). Other such situations will be readily apparent to one of skill in the art. Thus, a database manager 2720 is employed to process the information in product databases 2710(1)-(N) into (feasible) configurations for entry into database 2660. Moreover, maintenance of a given product's information is simplified. This is because the product's information is more accessible (because the product information is stored separately from the configuration and attribute information stored in database 2660) and quickly accessed (due to the relatively small database in which the product's information is stored).

Database manager 2720 can be configured to perform this translation in a number of different ways. For example, database manager 2720 can generate the set of feature combinations that users are likely to desire from the information in product databases 2710(1)-(N) for entry into database 2660. Alternatively, database manager 2720 can be configured to generate all possible product configurations from product databases 2710(1)-(N), for entry into database 2660. Another possible scenario is to have research manager 2720 generate a minimal set of configurations from product databases 2710(1)-(N), and then add configurations dynamically to database 2660 as such configurations are requested by users of the websites employing website architecture 2600.

Figure 28A:
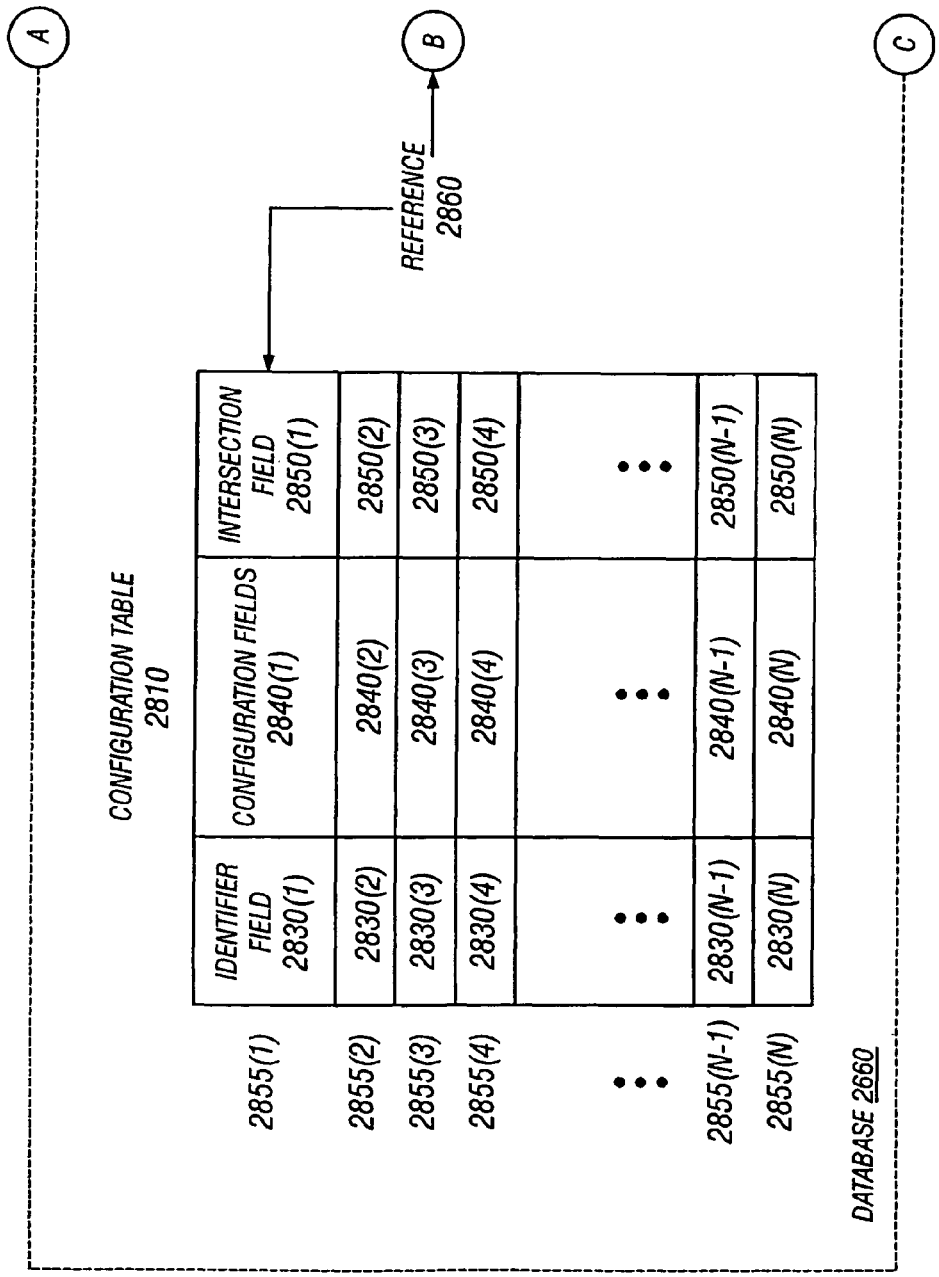
FIG. 28 illustrates an example of a database structure that can be used in the database of FIG. 27.
Figure 28B:
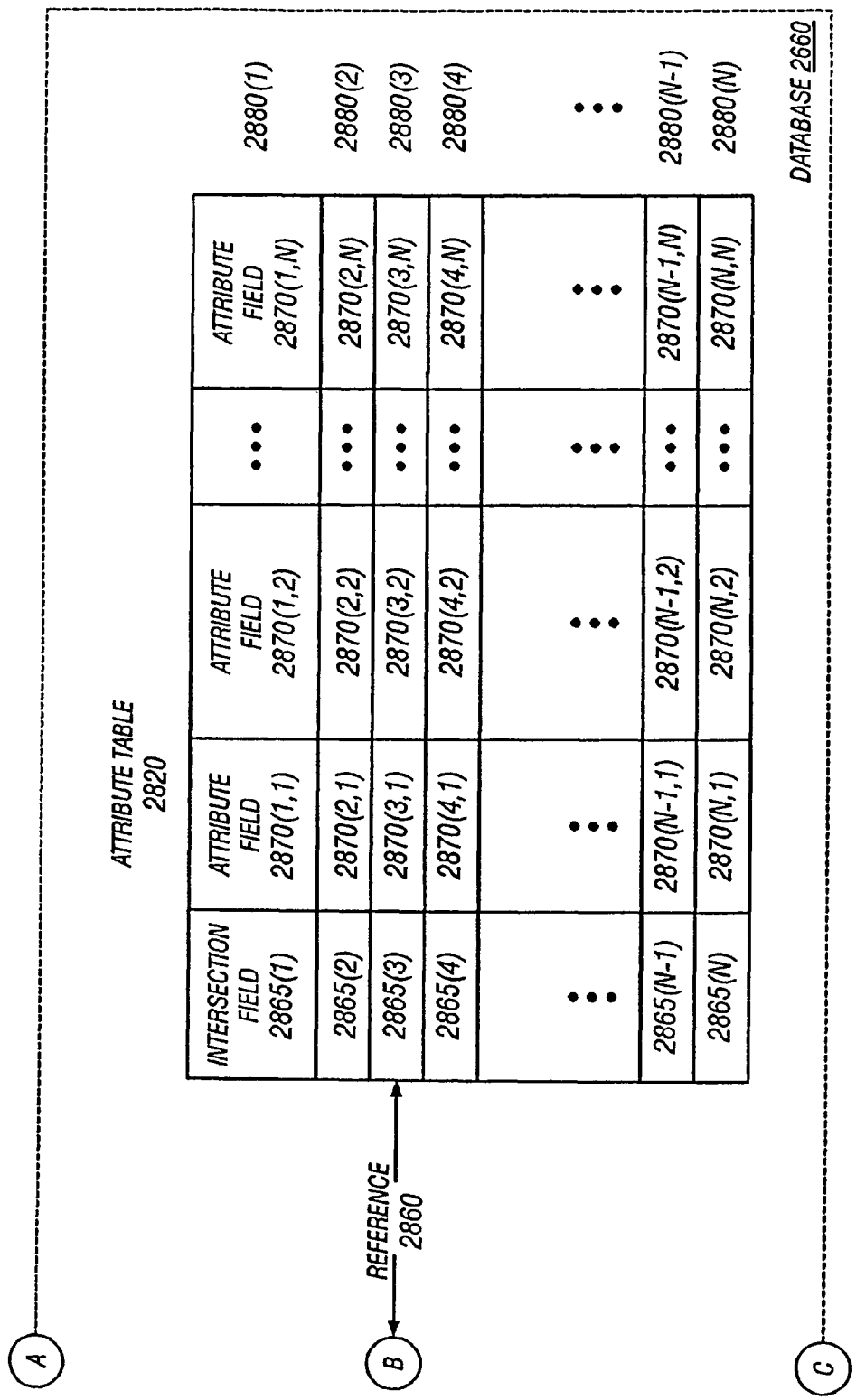

FIG. 28 illustrates an example of a database structure that can be used in database 2660. This database structure (exemplified in FIG. 28 by a database structure 2800) includes information regarding various product configurations (e.g., vehicle equipment configurations) and the attributes that make up such configurations, for example. This information can be held in a configuration table 2810 and an attribute table 2820, respectively, which are simply example representations of structures which may be used to maintain such information. Configuration table 2810 includes identifier fields 2830(1)-(N), configuration fields 2840(1)-(N) and intersection fields 2850(1)-(N). A record in configuration table 2810 (exemplified by one of Configuration table records 2855(1)-(N)) includes a corresponding one of each of identifier fields 2830(1)-(N), configuration fields 2840(1)-(N) and intersection fields 2850(1)-(N). Each of configuration table records 2855(1)-(N) corresponds to one of the configurations created by research manager 2720 from a corresponding one of product data bases 2710(1)-(N). In other words, the configuration represented by the corresponding one of configuration fields 2840(1)-(N) is generated from the product database corresponding to the given product using the information and rules contained in the corresponding one of product databases 2710(1)-(N). Thus, each configuration generated from product databases 2710(1)-(N) by research manager 2720 appears in configuration table 2810 as one of configuration fields 2840(1)-(N) and can be accessed as such using the corresponding one of identifier fields 2830(1)-(N) for example. Also provided as part of configuration table 2810 are intersection fields 2850(1)-(N). Intersection fields 2850(1)-(N) allow access to attribute table 2820 from a given one of configuration table records 2855(1)-(N).

Attribute table 2820 includes intersection fields 2865(1)-(N) and a number of attribute fields (depicted in FIG. 28 by attribute fields 2870(1,1)-(N,N)) that are broken up into a set of records (exemplified by attribute table records 2880(1)-(N)). While configuration table 2810 maintains information regarding various configurations of products and their features, attribute table 2820 maintains corresponding information with regard to the actual attributes of the product. Intersection fields 2865(1)-(N) allow access to attribute table 2820 from a given one of configuration table records 2855(1)-(N). Records in configuration table 2810 and attribute table 2820 reference one another via references such as a reference 2860. For example, configuration table record 2855(1) is referenced to attribute table record 2880(3) using information held in intersection field 2850(1), and attribute table record 2880(3) is referenced to configuration table record 2855(1) using information held in intersection field 2865(3). This cross-referencing is depicted in FIG. 28 by reference 2860. Thus, searching configurations using attributes, or vice versa (searching attributes using configurations (e.g., configuration IDs)) can be performed.

For example, in the situation in which compare module 2640 sends an identifier 2665 to compare service 2645 requesting the attributes of a product with an identifier matching identifier 2665, compare service 2645 accesses database 2660 by providing identifier 2665. Identifier 2665 is then used to access one of configuration table records 2855(1)-(N) corresponding to that identifier, and so a corresponding one of intersection fields 2850(1)-(N). Once the corresponding intersection field has been accessed, the reference into attribute table 2820 (and so to a corresponding one of attribute table records 2880(1)-(N)) can be made, and the requisite attributes passed back to compare service 2645 for provision to compare module 2640 as attributes 2670.

Because the references between configuration table 2810 and attribute table 2820 can be bi-directional (e.g., reference 2860), the preceding process may be reversed to support searching of database 2660 based on the user's needs. Such functionality appears in FIG. 26 as filter service 2650, which receives attributes 2675 from compare module 2640 and uses these attributes to access information in database 2660, as follows. Upon receiving attributes 2675, filter service 2650 uses the attributes therein to access attribute table 2820 by matching (in some way) one or more of attribute fields 2870(1,1)-(N,N) in order to identify those of attribute table records 2880(1)-(N) which are desired. Once the desired attribute table records have been identified, each corresponding reference is used to access a given one of configuration table records 2855(1)-(N). Having identified desired ones of configuration table records 2855(1)-(N), information stored in each one of identifier fields 2830(1)-(N) corresponding to the desired set of attributes can then be provided by filter service 2650 to compare module 2640 (e.g., identifier 2680).

Another permutation supported by database structure 2800 is depicted in FIG. 26 in the provision of identifier 2685 by compare module 2640 to configuration service 2655. In this situation, identifier 2685 is used by configuration service 2655 in accessing database 2660 in order to generate a list of configurations matching identifier 2685 (depicted in FIG. 26 in the response by parts service 2655 as configuration list 2690). In this scenario, identifier 2685 is used to identify one or more of configuration table records 2855(1)-(N) corresponding to the desired configurations by matching identifier 2685 to one or more corresponding ones of identifier fields 2830(1)-(N), and so to access corresponding ones of configuration fields 2840(1)-(N). Once the desired configuration fields have been identified, this information is passed by configuration service 2655 to compare module 2640 as configuration list 2690.

Figure 29:
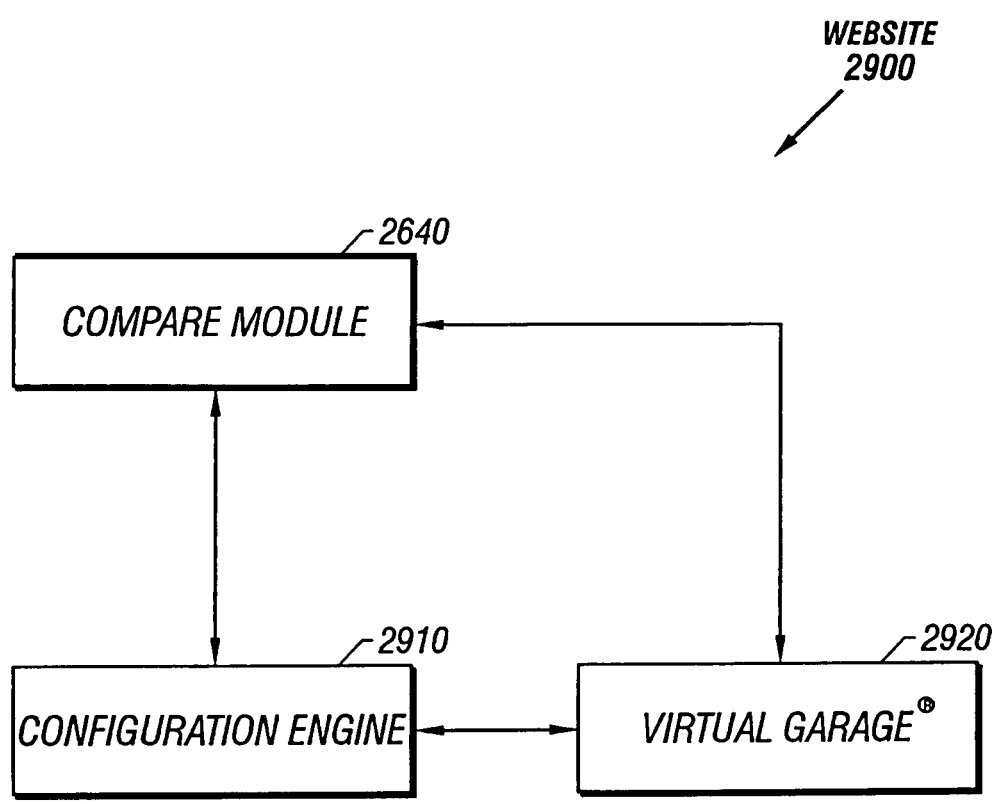
FIG. 29 is a block diagram illustrating an example of a website according to embodiments of the present invention.

FIG. 29 is a block diagram illustrating an example of a website 2900 employing website architecture 2600. In addition to compare module 2640, website 2900 includes a configuration engine 2910 and a Virtual Garage® 2920. Configuration engine 2910 allows a user to configure a vehicle, and can be accessed from the comparison process (e.g., web page 2200, using one of hypertext link 2260 or hypertext link 2265). Virtual Garage® 2920 permits the user to store a configured vehicle. In addition to storing a vehicle configured using configuration engine 2910, Virtual Garage® 2920 is also configured to accept such information from compare module 2640. Moreover, Virtual Garage® 2920 can accept such information without user intervention (e.g., requiring a user to re-enter configuration information regarding the given vehicle). This ability is supported by the data persistence discussed previously, and so entails the functionalities provided by services layer 2620. Once stored in the user's Virtual Garage® (e.g., Virtual Garage® 2920), the configured vehicle can be loaded into configuration engine 2910 for review and/or reconfiguration, or into compare module 2640 for comparison with one or more other vehicles.

In a similar fashion, a configured vehicle can be transferred between compare module 2640 and configuration engine 2910. For example, a vehicle configured in compare module 2640 (e.g., by a user navigating to web page 104 via web page 1900, a user generating a comparable vehicle, or by some other method) can be transferred to configuration engine 2910. This allows a user to further configure a vehicle configuration, identified as desirable using compare module 2640, using configuration engine 2910. The vehicle configuration, once defined in using compare module 2640, can then be stored in Virtual Garage® 2920. This process is simplified by the persistence provided by services layer 2620, which again obviates the need for a user to re-enter configuration information regarding the given vehicle.

The ability to persist a vehicle configuration can be supported by a number of features that are preferably included in website architecture 2600. First, persistence is supported by the inclusion of all information necessary to elucidate all relevant equipment features selected by a user in the data structured used to store/represent a given configuration of a vehicle (regardless of the method used to indicate such selections (e.g., by comparison, configuration or by another method). Moreover, it is preferable that a Virtual Garage® such as Virtual Garage® 2920 maintain such information, to avoid the need for a user to re-enter such information, and to simplify and speed the use of website 2900. The inclusion of relevant information (e.g., all required configuration information, including user-selectable information) also allows such configurations to easily by passed between compare module 2640 and configuration engine 2910, again obviating the need for re-entry by the user.

The configuration of database 2660 also enhances the transfer of vehicle configurations between compare module 2640 and configuration engine 2910, and between compare module 2640 and Virtual Garage® 2920. By providing the ability to generate a configuration list from an identifier, using configuration service 2655, website architecture 2600 allows compare module 2640 to quickly and easily generate a configured vehicle. This can be done, for example, by identifying the desired vehicle configuration using information regarding make, model, trimline (trim) and equipment level (e.g., as depicted in FIG. 19 and FIG. 25). Once generated, this configuration can then easily be passed to configuration engine 2910 or to Virtual Garage® 2920.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for storing and retrieving product configuration data, the method comprising:
    performing by a server-side computer system programmed with code stored in a memory and executing by a processor of the computer system to configure the computer system into a machine for:
        receiving client-side, user specified product configuration selection data during a first web session;

processing the user specified product configuration selection data received including transitions from a current state of a user specified product configuration and actions taken by the user while in the current state in a state machine model in accordance with a state machine model to generate a state of a configured product;

storing a state of a configured product by the user in a server-side storage medium, wherein the configured product corresponds to product configuration data associated with the received user specified product configuration selection data, wherein storing the state of the configured product further comprises:

storing a state of a configured product by the user in a server-side storage medium in a services layer and make the state of the configuration available to other functions of server-side computer system without further intervention by a user of a client-side computer system coupled to the service-side computer system and to allow a user to subsequently retrieve the state of the configured product without having to reenter configuration information, wherein the configured product corresponds to product configuration data associated with the received user specified product configuration selection data;

identifying the configuration data with a user specific identifier;

retrieving the stored product configuration data corresponding to the configured product in response to a request from a client-side web browser application during a second web session, wherein the request includes the user specific identifier and the second web session is a separate web site access from the first web session;

providing data to the requesting client-side web browser application during the second session that allows a user to view the product configured in accordance with the stored state;

receiving further user specified product configuration selection data from the client-side web browser application during the second web session that reconfigures the configured product, wherein the data that reconfigures the configured product varies one or more previous configured features of the configured product;

generating a first set of product configurations;

generating a second set of product configurations by adding to the first set of product configurations additional product configurations requested from users of client-side computer systems;

retrieving one or more product configurations from the second set of product configurations;

retrieving base-product model data from a memory, wherein the base-product model data represents a configuration by a manufacturer of a base-product model; and providing data to the client-side computer system to display a comparison of the product configured in accordance with the stored state with the retrieved one or more product configurations from the second set of product configurations and with the base-product model data.

2. The method of claim 1 wherein the data provided to the requesting client-side web browser during the second session that corresponds to the stored configuration data allows the user to perform the following operations:

reconfiguring a product specified by the initial user specified product configuration selection data;

reviewing a product specified by the initial user specified product configuration selection data; and comparing the product configured in accordance with the stored state with a second product.

3. The method of claim 1 wherein the identifier comprises a user unique code.

4. The method of claim 1 wherein the configured product is a vehicle.

5. A method for allowing a user to store and retrieve product configuration data associated with configuration selections made by the user using a client-side computer system, the method comprising:

performing by a client-side computer system programmed with code stored in a memory and executing by a processor of the computer system to configure the computer system into a machine for:

accessing a configuration web site to initiate a first user session to configure a product by the user;

providing product configuration selections to the configuration web site;

requesting the configuration web site to store a state of the configured product corresponding to the product configuration data associated with the product configuration selections to allow a user to subsequently retrieve the state of the configured product without having to reenter configuration information;

providing user identification information to the configuration web site to create a user identifier and associate the stored product configuration data with the user;

accessing the configuration web site to initiate a second user session, wherein the second web session is a separate web site access from the first web session;

providing the user identifier to the configuration web site;

requesting the configuration web site to retrieve the stored configuration data corresponding to the configured product, wherein requesting the configuration web site to retrieve the stored configuration data is separate from providing the user identifier to the configuration web site;

receiving product configuration data matching the stored state of the configured product;

providing product configuration selections to the configuration web site during the second user session to reconfigure the product, wherein the product configuration selections that reconfigure the configured product vary previous configured features of the configured product;

receiving base-product model data from a memory, wherein the base-product model data represents a configuration by a manufacturer of a base-product model; and receiving data to display a comparison of the product configured in accordance with the stored state with one or more product configurations from a first set of product configurations and with the base-product model data, wherein the first set of product configurations comprises a generated set of product configurations and additional product configurations requested from other client-side computer systems.

6. The method of claim 5 further comprising:

providing data to the client-side computer system to display a comparison of the product configured in accordance with the stored state with a second product.

7. The method of claim 5 wherein the identifier comprises a user unique code.

8. The method of claim 5 wherein the product is a vehicle.

9. A non-transitory, computer readable medium comprising code stored therein and executable by a processor to configure a computer system into a machine to:
   receive client-side, user specified product configuration selection data during a first web session;
   process the user specified product configuration selection data received including transitions from a current state of a user specified product configuration and actions taken by the user while in the current state in a state machine model in accordance with a state machine model to generate the state of a configured product;
   store the state of the configured product by the user in a server-side storage medium in a services layer and make the state of the configuration available to other functions wherein the configured product corresponds to product configuration data associated with the received user specified product configuration selection data, wherein the code to store the state of the configured product is further configured to cause the processor to:
     store the state of the configured product by the user in a server-side storage medium in a services layer and make the state of the configuration available to other functions of server-side computer system without further intervention by a user of a client-side computer system coupled to the service-side computer system and to allow a user to subsequently retrieve the state of the configured product without having to reenter configuration information, wherein the configured product corresponds to product configuration data associated with the received user specified product configuration selection data;
   identify the configuration data with a user specific identifier;
   retrieve the stored product configuration data corresponding to the configured product in response to a request from a client-side web browser application during a second web session, wherein the request includes the user specific identifier and the second web session is a separate web site access from the first web session;
   provide data to the requesting client-side web browser application during the second session that allows the user to view the product configured in accordance with the stored state;
   receive further user specified product configuration selection data from the client-side web browser application during the second web session that reconfigures the configured product, wherein the data that reconfigures the configured product varies one or more previous configured features of the configured product;
   generate a first set of product configurations;
   generate a second set of product configurations by adding to the first set of product configurations additional product configurations requested from users of client-side computer systems;
   retrieve one or more product configurations from the second set of product configurations;
   retrieve base-product model data from a memory, wherein the base-product model data represents a configuration by a manufacturer of a base-product model; and
   provide data to the client-side computer system to display a comparison of the product configured in accordance with the stored state with the retrieved one or more product configurations from the second set of product configurations and with the base-product model data.

10. The computer readable medium of claim 9 wherein the code is further configured to cause the processor to:
   provide data to the client-side computer system to display a comparison of the product configured in accordance with the stored state with a second product.

11. The computer readable medium of claim 9 wherein the configured product is a vehicle.

12. The computer readable medium of claim 9 wherein the identifier comprises a user unique code.

13. A web site data processing system for storing and retrieving product configuration data, the system comprising:
   a processor; and
   a storage medium coupled to the processor, the storage medium having code stored therein to cause the processor to configure a computer system into the web site data processing system to:
   receive user specified product configuration selection data from a client-side web browser application during a first web session;
     processing the user specified product configuration selection data received including transitions from a current state of a user specified product configuration and actions taken by the user while in the current state in a state machine model in accordance with a state machine model to generate a state of a configured product;
     store the state of the configured product by the user, wherein the configured product corresponds to product configuration data associated with the received user specified product configuration selection data wherein the code to store the configured state is further configured to cause the processor to:
       store the state of the configured product by the user in a server-side storage medium in a services layer and make the state of the configuration available to other functions of server-side computer system without further intervention by a user of a client-side computer system coupled to the service-side computer system and to allow a user to subsequently retrieve the state of the configured product without having to reenter configuration information, wherein the configured product corresponds to product configuration data associated with the received user specified product configuration selection data;
     identify the configuration data with a user specific identifier;
     retrieve the stored product configuration data corresponding to the configured product in response to a request from a client-side web browser application during a second web session, wherein the request includes the user specific identifier and the second web session is a separate web site access from the first web session;
     provide data to the requesting client-side web browser application during the second session that allows the user to view the product configured in accordance with the stored state;
     receive further user specified product configuration selection data from the client- side web browser application during the second web session that reconfigures the configured product, wherein the data that reconfigures the configured product varies one or more previous configured features of the configured product;
generate a first set of product configurations;
generate a second set of product configurations by adding to the first set of product configurations additional product configurations requested from users of client-side computer systems;
retrieve one or more product configurations from the second set of product configurations;
retrieve base-product model data from a memory, wherein the base-product model data represents a configuration by a manufacturer of a base-product model; and
provide data to the client-side computer system to display a comparison of the product configured in accordance with the stored state with the retrieved one or more product configurations from the second set of product configurations and with the base-product model data.

14. The system of claim 13 wherein the storage medium comprises additional code to cause the processor to:
providing data to the client-side computer system to display a comparison of the product configured in accordance with the stored state with a second product.

15. The system of claim 13 wherein the configured product is a vehicle.

16. The system of claim 13 wherein the identifier comprises a user unique code.

17. A system for storing and retrieving product configuration data, the system comprising:
means for receiving user specified product configuration selection data from a client-side web browser application during a first web session;
means for processing the user specified product configuration selection data received including transitions from a current state of a user specified product configuration and actions taken by the user while in the current state in a state machine model in accordance with a state machine model to generate a state of a configured product;
storing the state of the configured product
means for storing the state of the configured product by the user in a server-side storage medium, wherein the configured product corresponds to product configuration data associated with the received user specified product configuration selection data, wherein the means for storing the state of the configured product further comprises:
means for storing the state of the configured product by the user in a server-side storage medium in a services layer and make the state of the configuration available to other functions of server-side computer system without further intervention by a user of a client-side computer system coupled to the service-side computer system and to allow a user to subsequently retrieve the state of the configured product without having to reenter configuration information, wherein the configured product corresponds to product configuration data associated with the received user specified product configuration selection data;
means for identifying the configuration data with a user specific identifier;
means for retrieving the stored product configuration data corresponding to the configured product in response to a request from a client-side web browser application during a second web session, wherein the request includes the user specific identifier and the second web session is a separate web site access from the first web session;
means for providing data to the requesting client-side web browser application during the second session that allows the user to view the product configured in accordance with the stored state;
means for receiving further user specified product configuration selection data from the client-side web browser application during the second web session that reconfigures the configured product, wherein the data that reconfigures the configured product varies one or more previous configured features of the configured product;
means for generating a first set of product configurations;
means for generating a second set of product configurations by adding to the first set of product configurations additional product configurations requested from users of client-side computer systems;
means for retrieving one or more product configurations from the second set of product configurations;
means for retrieving base-product model data from a memory, wherein the base-product model data represents a configuration by a manufacturer of a base-product model; and
means for providing data to the client-side computer system to display a comparison of the product configured in accordance with the stored state with the retrieved one or more product configurations from the second set of product configurations and with the base-product model data.

18. The method of claim 2 further comprising:
receiving client-side, user specified product configuration selection data during a third web session;
processing the stored product configuration data corresponding to the configured product to facilitate a feature by feature comparison of the product configured in accordance with the stored state to a product configured during the third web session; and
providing data to a computer system of the user during the third session that allows a user to view the feature by feature comparison of the product configured in accordance with the stored state to a product configured during the third web session.

19. The method of claim 5 wherein the product corresponding to the stored configuration data is a first product, the method further comprising:
providing product configuration selection data to the configuration web site for configuration of a second product;
receiving product comparison data to display a feature-by-feature comparison of the first and second products.

20. The computer readable medium of claim 9 wherein the code is further configured to cause the processor to:
receive a client-side, user specified product configuration selection during a third web session;
process the stored product configuration data corresponding to the configured product to facilitate a feature by feature comparison of the product configured in accordance with the stored state to a product configured during the third web session; and
provide data to a computer system of the user during the third session that allows a user to view the feature by feature comparison of the product configured in accordance with the stored state to a product configured during the third web session.

21. The system of claim 13 wherein the code is further configured to cause the processor to:
- receive client-side, user specified product configuration selection data during a third web session;
- process the stored product configuration data corresponding to the configured product to facilitate a feature by feature comparison of the product configured in accordance with the stored state to a product configured during the third web session; and
- provide data to a computer system of the user during the third session that allows a user to view the feature by feature comparison of the product configured in accordance with the stored state to a product configured during the third web session.

\* \* \* \* \*